US012597633B2

(12) United States Patent
Onuma et al.

(10) Patent No.: US 12,597,633 B2
(45) Date of Patent: Apr. 7, 2026

(54) NEGATIVE ELECTRODE FOR SECONDARY BATTERY, AND SECONDARY BATTERY

(71) Applicant: MURATA MANUFACTURING CO., LTD., Kyoto (JP)

(72) Inventors: Ami Onuma, Kyoto (JP); Shinji Hayazaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 444 days.

(21) Appl. No.: 17/723,861

(22) Filed: Apr. 19, 2022

(65) Prior Publication Data

US 2022/0246979 A1 Aug. 4, 2022

Related U.S. Application Data

(63) Continuation of application No. PCT/JP2020/039482, filed on Oct. 21, 2020.

(30) Foreign Application Priority Data

Oct. 28, 2019 (JP) ................................. 2019-195409

(51) Int. Cl.
| | |
|---|---|
| *H01M 4/583* | (2010.01) |
| *H01M 4/36* | (2006.01) |
| *H01M 4/38* | (2006.01) |
| *H01M 4/62* | (2006.01) |

(Continued)

(52) U.S. Cl.
CPC ....... *H01M 10/0525* (2013.01); *H01M 4/364* (2013.01); *H01M 4/386* (2013.01); *H01M 4/583* (2013.01); *H01M 4/625* (2013.01);

*H01M 2004/021* (2013.01); *H01M 2004/027* (2013.01); *H01M 2300/0028* (2013.01)

(58) Field of Classification Search
CPC ...... H01M 4/364; H01M 4/386; H01M 4/583; H01M 4/625
See application file for complete search history.

(56) References Cited

U.S. PATENT DOCUMENTS

| | | | | |
|---|---|---|---|---|
| 2008/0170982 A1* | 7/2008 | Zhang | ................... | C01B 32/154 |
| | | | | 423/447.3 |
| 2013/0189565 A1* | 7/2013 | Lashmore | ................ | H01B 1/04 |
| | | | | 29/623.2 |

(Continued)

FOREIGN PATENT DOCUMENTS

| | | |
|---|---|---|
| CN | 106463710 | 2/2017 |
| CN | 108461804 | 8/2018 |

(Continued)

OTHER PUBLICATIONS

"Carbon Nanotubes—the Route Toward Applications", Baughman et al., Science 297, 787, p. 787-792. Aug. 2, 2002.*

(Continued)

*Primary Examiner* — Kenneth J Douyette
(74) *Attorney, Agent, or Firm* — K&L Gates LLP

(57) ABSTRACT

A secondary battery includes a positive electrode, a negative electrode, and an electrolytic solution. The negative electrode includes a silicon-containing material and a plurality of single-walled carbon nanotubes. The single-walled carbon nanotubes have a maximum outer diameter of 5 nanometers or less.

9 Claims, 10 Drawing Sheets

(51) Int. Cl.
    *H01M 10/0525*     (2010.01)
    *H01M 4/02*     (2006.01)

(56)          References Cited

U.S. PATENT DOCUMENTS

| | | | |
|---|---|---|---|
| 2013/0216922 A1* | 8/2013 | Zheng | H01M 12/08 |
| | | | 429/405 |
| 2015/0311504 A1 | 10/2015 | Hong et al. | |
| 2016/0365565 A1 | 12/2016 | Park et al. | |
| 2017/0110722 A1 | 4/2017 | Lee et al. | |
| 2018/0198159 A1* | 7/2018 | Azami | H01M 4/133 |
| 2018/0201709 A1* | 7/2018 | Morita | C08F 216/38 |
| 2019/0036102 A1 | 1/2019 | Pierce et al. | |
| 2019/0237753 A1* | 8/2019 | Ren | H01M 10/0525 |
| 2020/0058941 A1 | 2/2020 | Hayashi et al. | |

FOREIGN PATENT DOCUMENTS

| | | |
|---|---|---|
| CN | 108878855 | 11/2018 |
| JP | 2017501546 A | 1/2017 |
| JP | 2017076597 A | 4/2017 |
| JP | 2017084759 A | 5/2017 |
| JP | 2017514290 A | 6/2017 |
| JP | 2019050185 A | 3/2019 |
| JP | 2019110108 A | 7/2019 |
| WO | 2013147087 A1 | 10/2013 |
| WO | 2017188021 A1 | 11/2017 |
| WO | 2018146865 A1 | 8/2018 |

OTHER PUBLICATIONS

Chinese Office Action issued Mar. 22, 2024 in corresponding Chinese Application No. 202080075205.X.

Chinese Office Action issued Juuly 1, 2024 in corresponding Chinese Application No. 202080075205.X.

International Search Report of corresponding PCT application PCT/JP2020/039482, dated Dec. 28, 2020.

Chinese Office Action issued Nov. 1, 2023 in corresponding Chinese Application No. 202080075205.X.

Japanese Office Action issued May 30, 2022 in corresponding Japanese Application No. 22021-553478.

\* cited by examiner

NEGATIVE ELECTRODE FOR SECONDARY BATTERY, AND SECONDARY BATTERY

CROSS REFERENCE TO RELATED APPLICATIONS

The present application is a continuation of PCT patent application no. PCT/JP2020/039452, filed on Oct. 21, 2020, which claims priority to Japanese patent application no. JP2019-195409, filed on Oct. 28, 2019, the entire contents of which are being incorporated herein by reference.

BACKGROUND

The present technology relates to a negative electrode for a secondary battery, and a secondary battery.

Various kinds of electronic equipment, including mobile phones, have been widely used. Such widespread use has promoted the development of a secondary battery that is smaller in size and lighter in weight and allows for a higher energy density, as a power source. The secondary battery includes a positive electrode, a negative electrode, and an electrolytic solution. The negative electrode includes a negative electrode active material and a negative electrode binder.

A configuration of the secondary battery influences a battery characteristic. Accordingly, the configuration of the secondary battery has been considered in various ways. For example, silicon monoxide is used as the negative electrode active material, and a single-walled carbon nanotube is used as a negative electrode conductor in order to obtain, for example, sufficient charge and discharge capacities. Further, a negative electrode active material which includes composite particles and carbon nanotubes is used in order to obtain, for example, a superior lifetime characteristic. The carbon nanotubes in the negative electrode active material are directly grown on surfaces of the composite particles that include, for example, silicon and natural graphite.

SUMMARY

The present application relates to a negative electrode for a secondary battery, and a secondary battery.

Consideration has been given in various ways to solve problems of the secondary battery; however, a battery capacity characteristic, an electric resistance characteristic, and a cyclability characteristic of the secondary battery each still remain insufficient. Accordingly, there is still room for improvement in terms of those characteristics.

The present technology has been made in view of such an issue, and is directed to providing a negative electrode for a secondary battery, and a secondary battery that are each able to increase the battery capacity and improve the electric resistance characteristic, the cyclability characteristic, or both according to an embodiment.

A negative electrode for a secondary battery according to an embodiment of the technology includes a silicon-containing material and a plurality of single-walled carbon nanotubes. The single-walled carbon nanotubes have a maximum outer diameter of 5 nm or less.

A secondary battery according to an embodiment of the technology includes a positive electrode, an electrolytic solution, and a negative electrode. The negative electrode includes a configuration similar to the configuration of the negative electrode for the secondary battery according to an embodiment of the technology described above.

The term "silicon-containing material" used herein is a generic term for a material including silicon (Si) as a constituent element. Thus, the silicon-containing material may be a simple substance of silicon, a compound of silicon, an alloy of silicon, or a mixture of two or more thereof.

According to the negative electrode for the secondary battery or the secondary battery of an embodiment of the technology, the negative electrode includes the silicon-containing material and the plurality of single-walled carbon nanotubes. The single-walled carbon nanotubes have a maximum outer diameter of 5 nm or less. Accordingly, it is possible to increase the battery capacity and improve the electric resistance characteristic, the cyclability characteristic, or both.

Note that effects of the technology are not necessarily limited to the effects described above and may include any of a series of suitable effects including described below in relation to the technology.

DETAILED DESCRIPTION

One or more embodiments of the present technology are described below in detail with reference to the drawings.

First, a description is given of a secondary battery according to an embodiment of the technology. Note that a negative electrode for a secondary battery according to an embodiment of the technology (hereinafter simply referred to as a "negative electrode") is a part or one component of the secondary battery described here, and is thus described together below.

The secondary battery described here is a secondary battery that obtains a battery capacity by utilizing insertion and extraction of an electrode reactant. The secondary battery includes a positive electrode, a negative electrode, and an electrolyte.

In the secondary battery, a charge capacity of the negative electrode is greater than a discharge capacity of the positive electrode in order to prevent accidental precipitation of the electrode reactant on a surface of the negative electrode in the middle of charging. In other words, an electrochemical capacity per unit area of the negative electrode is set to be greater than an electrochemical capacity per unit area of the positive electrode.

The electrode reactant is not limited to a particular kind and may be a light metal such as an alkali metal or an alkaline earth metal. In the following, a description is given of an example case where the electrode reactant is lithium. A secondary battery that utilizes insertion and extraction of lithium serving as the electrode reactant is a so-called lithium-ion secondary battery.

First, a secondary battery of a laminated-film type (a so-called laminated cell) is described. The secondary battery of the laminated-film type includes an outer package member having softness or flexibility, that is, an outer package film 20 as an outer package member for containing a battery device.

Figure 1:
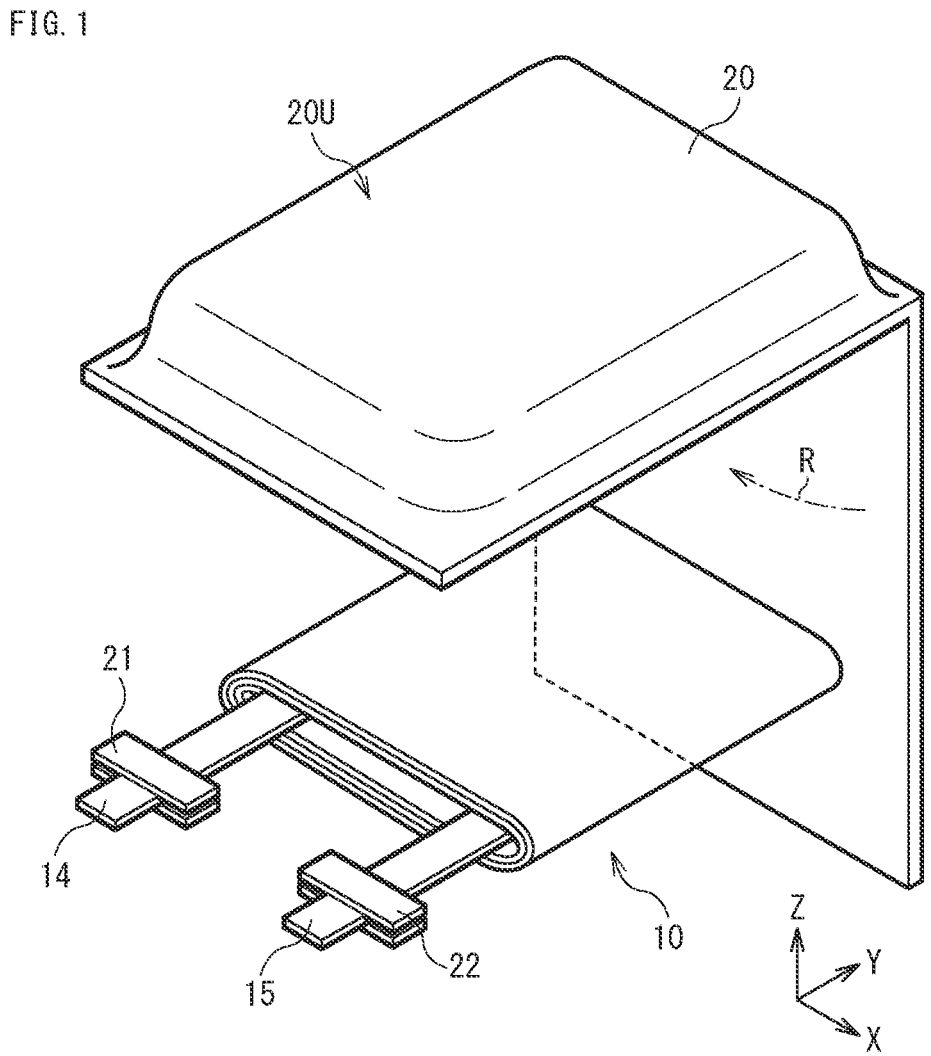
FIG. 1 is a perspective view of a configuration of a secondary battery of a laminated-film type according to an embodiment of the technology.
Figure 2:
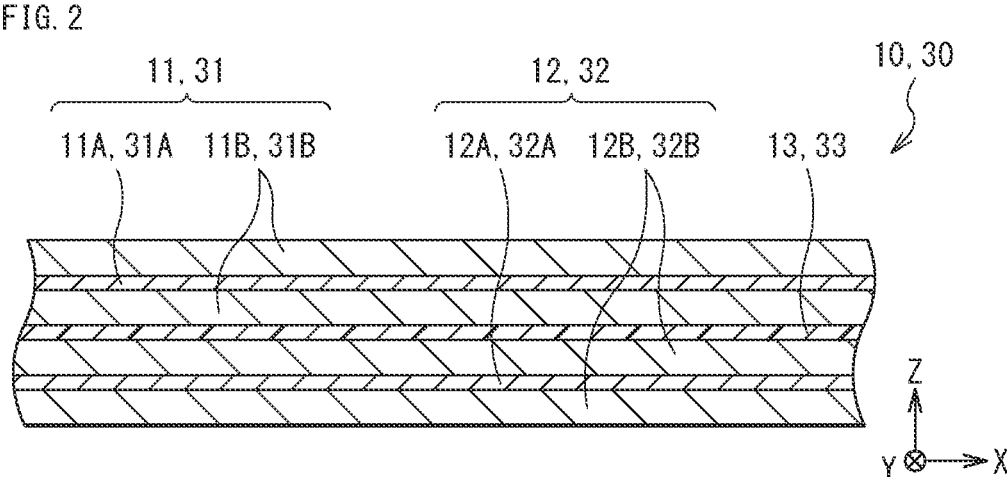
FIG. 2 is a sectional view of a configuration of a wound electrode body illustrated in FIG. 1.
Figure 3:
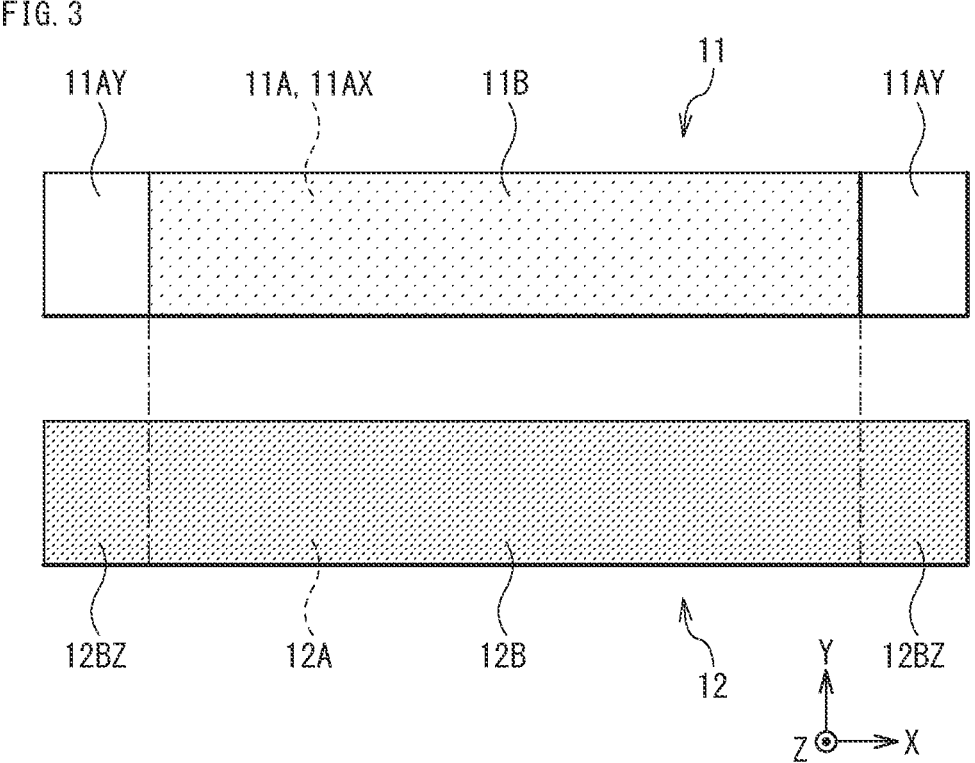
FIG. 3 is a plan view of a configuration of each of a positive electrode and a negative electrode illustrated in FIG. 2.

FIG. 1 is a perspective view of a configuration of the secondary battery of the laminated-film type. FIG. 2 illustrates a sectional configuration of a wound electrode body 10 illustrated in FIG. 1. FIG. 3 illustrates a plan configuration of each of a positive electrode 11 and a negative electrode 12 illustrated in FIG. 2.

Note that FIG. 1 illustrates a state where the wound electrode body 10 and the outer package film 20 are separated away from each other. FIG. 2 illustrates only a portion of the wound electrode body 10. FIG. 3 illustrates a state where the positive electrode 11 and the negative electrode 12 are separated away from each other. In FIG. 3, the positive electrode 11 and the negative electrode 12 are each reduced in size in a longitudinal direction.

As illustrated in FIG. 1, the secondary battery has the outer package film 20 having a pouch-shape in which a battery device of a wound type (the wound electrode body

10) is contained. A positive electrode lead 14 and a negative electrode lead 15 are coupled to the wound electrode body 10. The positive electrode lead 14 and the negative electrode lead 15 are each led out from inside to outside the outer package film 20 in a similar direction.

The outer package film 20 is a single film foldable in a direction of an arrow R indicated by a dash-dot-dash line illustrated in FIG. 1. The outer package film 20 has a depression 20U. The depression 20U is a so-called deep drawn part designed to contain the wound electrode body 10 therein.

Specifically, the outer package film 20 is a laminated film including three layers: a fusion-bonding layer, a metal layer, and a surface protective layer that are laminated in this order from an inner side. In a state where the outer package film 20 is folded in the direction of the arrow R, the outer edges of the fusion-bonding layer are fusion-bonded to each other. The fusion-bonding layer includes a polymer compound such as polypropylene. The metal layer includes a metal material such as aluminum. The surface protective layer includes a polymer compound such as nylon. Note that the number of layers laminated into the outer package film 20 is not limited to three. The outer package film 20 may include one layer (a single layer), two layers, or four or more layers.

A sealing film 21 is interposed between the outer package film 20 and the positive electrode lead 14, and a sealing film 22 is interposed between the outer package film 20 and the negative electrode lead 15. The sealing films 21 and 22 are members for preventing outside air from entering. The sealing films 21 and 22 include, without limitation, a polyolefin resin having adherence to the positive electrode lead 14 and the negative electrode lead 15. Examples of the polyolefin resin include polyethylene, polypropylene, modified polyethylene, and modified polypropylene. Note that the sealing film 21, the sealing film 22, or both may be omitted.

As illustrated in FIGS. 1 and 2, the wound electrode body 10 includes the positive electrode 11, the negative electrode 12, a separator 13, and an electrolytic solution. The electrolytic solution is a liquid electrolyte. In the wound electrode body 10, the positive electrode 11 and the negative electrode 12 are stacked on each other with the separator 13 interposed therebetween, and the stack of the positive electrode 11, the negative electrode 12, and the separator 13 is wound. The positive electrode 11, the negative electrode 12, and the separator 13 are each impregnated with the electrolytic solution.

As illustrated in FIG. 2, the positive electrode 11 includes a positive electrode current collector 11A, and two positive electrode active material layers 11B provided on respective opposite sides of the positive electrode current collector 11A. However, the positive electrode active material layer 11B may be provided on only one of the opposite sides of the positive electrode current collector 11A.

The positive electrode current collector 11A includes one or more of electrically conductive materials including, without limitation, aluminum, nickel, and stainless steel. The positive electrode active material layer 11B includes one or more of positive electrode active materials into which lithium is insertable and from which lithium is extractable. The positive electrode active material layer 11B may further include a material such as a positive electrode binder or a positive electrode conductor.

Although the positive electrode active material is not limited to a particular kind, the positive electrode active material is a lithium-containing compound such as a lithium-containing transition metal compound. The lithium-containing transition metal compound includes lithium and one or more of transition metal elements, and may further include one or more of other elements. The other elements are not limited to particular kinds as long as they are one or more of any elements excluding a transition metal element. In particular, it is preferable that the other elements be elements belonging to Groups 2 to 15 in the long period periodic table. Note that the lithium-containing transition metal compound may be an oxide, or may be, for example, one of a phosphoric acid compound, a silicic acid compound, or a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride and polyimide.

The positive electrode conductor includes an electrically conductive material such as a carbon material. Examples of the carbon material include graphite, carbon black, acetylene black, and Ketjen black. The positive electrode conductor may be a material such as a metal material or an electrically conductive polymer as long as the material has an electrically conductive property.

The positive electrode active material layer 11B is provided on a portion of the positive electrode current collector 11A on one side of the positive electrode current collector 11A. Accordingly, a portion of the positive electrode current collector 11A on which the positive electrode active material layer 11B is not provided is exposed without being covered with the positive electrode active material layer 11B.

Specifically, as illustrated in FIG. 3, the positive electrode current collector 11A extends in a longitudinal direction (X-axis direction) and includes a covered portion 11AX and paired uncovered portions 11AY. The covered portion 11AX is a portion which is located at the middle portion of the positive electrode current collector 11A in the longitudinal direction and on which the positive electrode active material layer 11B is formed. The paired uncovered portions 11AY are portions which are located at respective ends of the positive electrode current collector 11A in the longitudinal direction and on which the positive electrode active material layer 11B is not formed. Accordingly, the covered portion 11AX is covered with the positive electrode active material layer 11B, whereas the paired uncovered portions 11AY are exposed without being covered with the positive electrode active material layer 11B. In FIG. 3, the positive electrode active material layer 11B is slightly shaded.

As illustrated in FIG. 2, the negative electrode 12 includes a negative electrode current collector 12A, and two negative electrode active material layers 12B provided on respective opposite sides of the negative electrode current collector 12A. However, the negative electrode active material layer 12B may be provided only on one of the opposite sides of the negative electrode current collector 12A.

The negative electrode current collector 12A includes one or more of electrically conductive materials including, without limitation, copper, aluminum, nickel, and stainless steel. The negative electrode active material layer 12B includes a negative electrode active material into which lithium is insertable and from which lithium is extractable, and a negative electrode conductor. The negative electrode active material layer 12B may further include materials including, without limitation, a negative electrode binder.

The negative electrode active material includes a silicon-containing material. A reason for this is that a high theoretical capacity (i.e., battery capacity) is obtained.

As described above, the term "silicon-containing material" is a generic term for a material including silicon as a constituent element. The silicon-containing material may be a simple substance of silicon, a compound of silicon, an alloy of silicon, or a mixture of two or more thereof. Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v<2$), and $LiSiO$. Note that the range of v may be $0.2<v<1.4$.

It is preferable, in particular, the silicon-containing material include silicon oxide represented by $SiO_v$ ($0<v<2$) described above. It is more preferable that the silicon-containing material include SiO. A reason for this is that the amount of expansion or contraction at the time of charging and discharging is relatively small.

The negative electrode active material may further include one or more of other materials including, without limitation, a carbon-containing material and a metal-based material. Note that the silicon-containing material described above is excluded from the metal-based material described here.

The term "carbon-containing material" is a generic term for a material including carbon as a constituent element. Note that a material including both silicon and carbon as constituent elements shall be classified as the silicon-containing material, not as the carbon material. Additionally, the negative electrode conductor (single-walled carbon nanotubes) described below shall be excluded from the carbon-containing material described here. Specific examples of the carbon-containing material include graphitizable carbon, non-graphitizable carbon, and graphite. The graphite may be natural graphite, artificial graphite, or both. The graphite is a carbon material having an average interplanar spacing d002 of less than 0.34 nm. The graphitizable carbon is a carbon material having an average interplanar spacing d002 of 0.34 nm or greater and 0.36 nm or less. The non-graphitizable carbon is a carbon material having an average interplanar spacing d002 of 0.37 nm or greater.

It is preferable, in particular, that the carbon-containing material include graphite in order to increase the battery capacity and in order to form an electrically conductive network. Further, it is preferable that the carbon-containing material include a material that includes graphite particles of which surfaces are covered with a covering material, that is, covered particles, in order to reduce reactivity of the surface of the graphite to the electrolytic solution. The covering material includes one or more of materials including, without limitation, graphitizable carbon and non-graphitizable carbon. The thickness of the covering material is not limited to a particular thickness. However, it is preferable, in particular, that the thickness of the covering material be 10% or less of the radius of the covered particle, i.e., 10% or less of the distance from the surface of the covered particle to the center of the covered particle.

The term "metal-based material" is a generic term for a material that includes one or more of metal elements and metalloid elements that are each able to form an alloy with lithium, as a constituent element or constituent elements.

The metal-based material may thus be a simple substance, an alloy, a compound, or a mixture of two or more thereof. The metal-based material may include one or more of non-metallic elements. Specific examples of the metal element and the metalloid element include tin.

It is preferable, in particular, that the negative electrode active material include the carbon-containing material together with the silicon-containing material. A reason for this is that expansion or contraction of the negative electrode active material layer 12B is reduced at the time of charging and discharging while a high battery capacity is secured, as compared with a case where the negative electrode active material includes only the silicon-containing material.

The negative electrode conductor includes single carbon nanotubes, which are carbon substances each having a fiber shape (a tubular shape), i.e., so-called single-walled carbon nanotubes (SWCNT). Thus, the negative electrode active material layer 12B includes the single-walled carbon nanotubes serving as the negative electrode conductor, together with the silicon-containing material serving as the negative electrode active material. A reason for this is that, in a case where the negative electrode active material is in the form of particles, the particles of the negative electrode active material are electrically coupled to each other via the single-walled carbon nanotubes. This increases electron conductivity between the particles of the negative electrode active material, resulting in an increase in electrical conductivity of the negative electrode active material layer 12B.

The number of the single-walled carbon nanotubes per unit weight is greater than the number of multi-walled carbon nanotubes (MWCNT) per unit weight. Accordingly, using the single-walled carbon nanotubes as the negative electrode conductor sufficiently increases the electrical conductivity of the negative electrode active material layer 12B.

The negative electrode conductor may further include the multi-walled carbon nanotubes described above in addition to the single-walled carbon nanotubes. The multi-walled carbon nanotubes encompass nanotubes including double-walled (DW) carbon nanotubes.

The single-walled carbon nanotubes have a maximum outer diameter of 5 nm or less. That is, although the outer diameter (thickness) of each of the single-walled carbon nanotubes is not limited to a particular outer diameter, a maximum value of the outer diameters of the single-walled carbon nanotubes is 5 nm or less. Note that, the single-walled carbon nanotubes each have an outer diameter of approximately 1 nm to approximately 2 nm. The double-walled carbon nanotubes each have an outer diameter of approximately 5 nm to approximately 6 nm. The multi-walled carbon nanotubes each have an outer diameter of 10 nm to 200 nm both inclusive.

A reason for this is that the dispersibility of the single-walled carbon nanotubes in the negative electrode active material layer 12B is secured and the particles of the negative electrode active material are thus easily electrically coupled to each other via the single-walled carbon nanotubes. This markedly increases the electron conductivity between the particles of the negative electrode material, and thus markedly increases the electrical conductivity of the negative electrode active material layer 12B, as compared with a case where the dispersibility of the single-walled carbon nanotubes in the negative electrode active material layer 12B is insufficient.

That is, in the case where the dispersibility of the single-walled carbon nanotubes in the negative electrode active material layer 12B is insufficient, the single-walled carbon nanotubes are easily entangled with each other. This causes the outer diameter of the single-walled carbon nanotubes to increase easily, resulting in a maximum outer diameter of greater than 5 nm. In contrast, in a case where the dispersibility of the single-walled carbon nanotubes in the negative electrode active material layer 12B is sufficient, the single-walled carbon nanotubes are prevented from being easily entangled with each other. This helps to prevent an increase in the outer diameter of the single-walled carbon nanotubes, resulting in a maximum outer diameter of 5 nm or less.

The maximum outer diameter of the single-walled carbon nanotubes is determined as follows. First, the negative electrode active material layer 12B is observed with a microscope such as a scanning electron microscope (SEM). Thereafter, the outer diameter of the single-walled carbon nanotube is measured at ten different points on the basis of the result of observation (a micrograph) of the negative electrode active material layer 12B. Lastly, a maximum value is identified from the outer diameters measured at the ten points, and is set as the maximum outer diameter.

For the secondary battery described here, it is preferable that a physical property (the presence or absence of a five-point average differential peak described below) of the negative electrode 12 be properly controlled by controlling the orientation of the negative electrode conductor (the single-walled carbon nanotubes) into an appropriate state in order to further increase the electrical conductivity of the negative electrode 12 (the negative electrode active material layer 12B). The physical property of the negative electrode 12 is to be described in detail later.

The content of the negative electrode conductor (the single-walled carbon nanotubes) in the negative electrode active material layer 12B is not limited to a particular content. However, it is preferable, in particular, that the content of the negative electrode conductor (the single-walled carbon nanotubes) be 0.01 wt % to 0.03 wt % both inclusive. A reason for this is that the single-walled carbon nanotubes are prevented from being easily entangled with each other, and it thus becomes easier to control the orientations of the single-walled carbon nanotubes into appropriate states.

The negative electrode active material layer 12B is provided over the entire negative electrode current collector 12A on one side of the negative electrode current collector 12A. Accordingly, the negative electrode current collector 12A is entirely covered with the negative electrode active material layer 12B without being exposed.

Specifically, as illustrated in FIG. 3, the negative electrode current collector 12A extends in the longitudinal direction (X-axis direction), and the negative electrode active material layer 12B includes paired unopposed portions 12BZ. The paired unopposed portions 12BZ are opposed to the paired uncovered portions 11AY. That is, the paired unopposed portions 12BZ are not opposed to the positive electrode active material layer 11B and thus do not contribute to charging and discharging reactions. In FIG. 3, the negative electrode active material layer 12B is darkly shaded.

The negative electrode active material layer 12B is entirely provided on the negative electrode current collector 12A, whereas the positive electrode active material layer 11B is provided on only a portion (the covered portion 11AX) of the positive electrode current collector 11A, in order to prevent lithium extracted from the positive electrode active material layer 11B at the time of charging from precipitating on the surface of the negative electrode 12.

As illustrated in FIG. 2, the separator 13 is interposed between the positive electrode 11 and the negative electrode 12. The separator 13 allows lithium to pass therethrough while preventing short circuiting between the positive electrode 11 and the negative electrode 12 caused by contact between the positive electrode 11 and the negative electrode 12. The separator 13 is a porous film including one or more of synthetic resins including, without limitation, polytetrafluoroethylene, polypropylene, and polyethylene. The separator 13 may be a multi-layer film including two or more of such porous films stacked on each other.

The electrolytic solution includes a solvent and an electrolyte salt. Note that the electrolytic solution may further include various additives.

The solvent includes one or more of non-aqueous solvents (organic solvents). An electrolytic solution including the non-aqueous solvent(s) is a so-called non-aqueous electrolytic solution.

Examples of the non-aqueous solvent include esters and ethers. More specifically, examples of the non-aqueous solvent include a carbonic-acid-ester-based compound, a carboxylic-acid-ester-based compound, and a lactone-based compound. Examples of the carbonic-acid-ester-based compound include ethylene carbonate, propylene carbonate, dimethyl carbonate, diethyl carbonate, and methyl ethyl carbonate. Examples of the carboxylic-acid-ester-based compound include ethyl acetate, ethyl propionate, and ethyl trimethylacetate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

Examples of the non-aqueous solvent further include an unsaturated cyclic carbonic acid ester, a halogenated carbonic acid ester, a sulfonic acid ester, a phosphoric acid ester, an acid anhydride, a nitrile compound, and an isocyanate compound. A reason for this is that the chemical stability of the electrolytic solution increases. Specific examples of the non-aqueous solvent include vinylene carbonate, vinylethylene carbonate, methylene ethylene carbonate, fluoroethylene carbonate, difluoroethylene carbonate, 1,3-propane sultone, trimethyl phosphate, succinic anhydride, sulfobenzoic anhydride, acetonitrile, succinonitrile, and hexamethylene diisocyanate.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$). Although the content of the electrolyte salt is not limited to a particular content, the content of the electrolyte salt is 0.3 mol/kg to 3.0 mol/kg both inclusive with respect to the solvent. A reason for this is that high ion conductivity is obtainable.

The positive electrode lead 14 is coupled to the positive electrode 11 (the positive electrode current collector 11A), and the negative electrode lead 15 is coupled to the negative electrode 12 (the negative electrode current collector 12A). The positive electrode lead 14 includes one or more of electrically conductive materials including, without limitation, aluminum, and the negative electrode lead 15 includes one or more of electrically conductive materials including, without limitation, copper, nickel, and stainless steel. The positive electrode lead 14 and the negative electrode lead 15 each have a shape such as a thin plate shape or a meshed shape.

As described above, it is preferable for the secondary battery that the physical property (the presence or absence of the five-point average differential peak) of the negative electrode 12 be properly controlled by controlling the orientation of the negative electrode conductor (the single-walled carbon nanotubes) into an appropriate state in order to further increase the electrical conductivity of the negative electrode 12 (the negative electrode active material layer 12B).

Specifically, the negative electrode active material layer 12B is analyzed by Raman spectroscopy to thereby measure a Raman spectrum of the negative electrode active material layer 12B in a radial breathing mode (RBM). The Raman spectrum is defined by a horizontal axis representing a Raman shift ($cm^{-1}$) and a vertical axis representing a Raman intensity. Thereafter, five-point average differentiation of the Raman spectrum in the RBM is acquired. The five-point average differentiation is defined by a horizontal axis representing a Raman shift ($cm^{-1}$) and a vertical axis representing of a five-point average differential value of the Raman intensity. Hereinafter, the Raman spectrum in the RBM is referred to as a "RBM spectrum", and the five-point average differentiation of the Raman spectrum in the RBM is referred to as a "five-point average differential spectrum".

The "five-point average differentiation" described above is a calculation process in which the calculation of an average value of values at five latest points (five Raman intensities) based on a plurality of pieces of data (Raman intensities) of the RBM spectrum and the calculation of a differential value of the average value are repeated.

A peak is thereby detected in the five-point average differential spectrum in the range of Raman shift from 165 $cm^{-1}$ to 185 $cm^{-1}$ both inclusive. Hereinafter, the peak described here is referred to as a "five-point average differential peak".

That is, in a case where the orientations of the single-walled carbon nanotubes in the negative electrode active material layer 12B are controlled into appropriate states, the five-point average differential peak is detected in the five-point average differential spectrum. In contrast, in a case where the orientations of the single-walled carbon nanotubes in the negative electrode active material layer 12B are not controlled into appropriate states, no five-point average differential peak is detected in the five-point average differential peak spectrum. Accordingly, it is possible to determine whether or not the orientations of the single-walled carbon nanotubes are controlled into appropriate states on the basis of whether or not the five-point average differential spectrum is detected.

Note that the five-point average differential peak is a peak defined by three inflection points: a first inflection point, a second inflection point, and a third inflection point. That is, the five-point average differential peak is a peak having an upward convex shape determined on the basis of the three inflection points. The first inflection point is an inflection point located at a position where the Raman shift is smaller than that at the top of the peak. A decrease in the five-point average differential value before the first inflection point turns into an increase in the five-point average differential value at the first inflection point. The second inflection point is an inflection point located at the top of the peak. An increase in the five-point average differential value before the second inflection point turns into a decrease in the five-point average differential value at the second inflection point. The third inflection point is an inflection point located at a position where the Raman shift is larger than that at the top of the peak. A decrease in the five-point average differential value before the third inflection point turns into an increase in the five-point average differential value at the third inflection point.

That is, in a case where the five-point average differential value varies so that the five-point average differential spectrum has an upward convex shape in the range of Raman shift of 165 cm$^{-1}$ to 185 cm$^{-1}$ both inclusive, the upward convex portion defined by the three inflection points corresponds to the five-point average differential peak; whereas an upward convex portion defined by two or less inflection points does not correspond to the five-point average differential peak.

Figure 4:
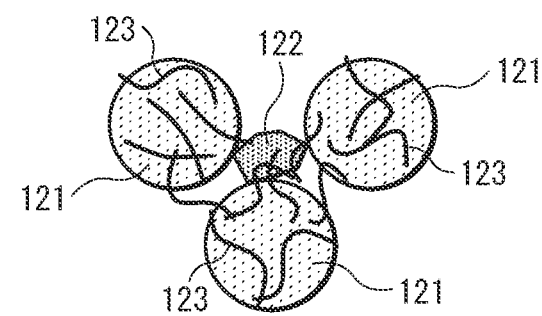
FIG. 4 is a plan view for describing an orientation of a negative electrode conductor in the secondary battery according to an embodiment of the technology.
Figure 5:
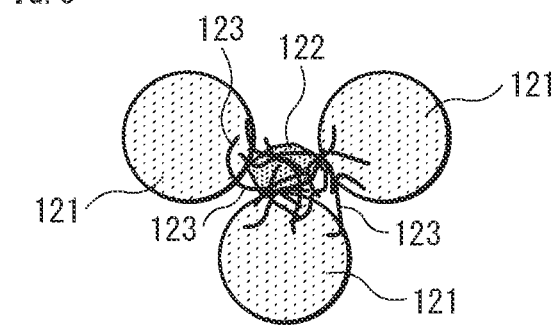
FIG. 5 is a plan view for describing an orientation of the negative electrode conductor in a first comparative example.
Figure 6:
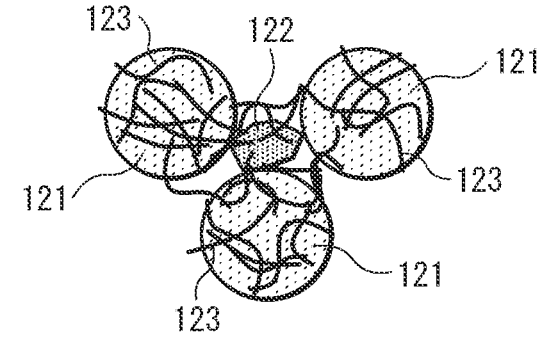
FIG. 6 is a plan view for describing an orientation of the negative electrode conductor in a second comparative example.

Now, the orientation of the negative electrode conductor (the single-walled carbon nanotubes) described above is described in detail. FIGS. 4 to 6 each illustrate a plan configuration of main components of the negative electrode active material layer 12B for describing the orientation of the negative electrode conductor. Described here as the main components of the negative electrode active material layer 12B are negative electrode active materials 121 each including a carbon-containing material, a negative electrode active material 122 including a silicon-containing material, and negative electrode conductors 123 each including a single-walled carbon nanotube.

FIG. 4 illustrates a case where the physical property of the negative electrode 12 is properly controlled (the present embodiment). FIGS. 5 and 6 illustrate respective cases where the physical property of the negative electrode 12 is not properly controlled (a first comparative example and a second comparative example). Note that, in each of FIGS. 4 to 6, the negative electrode active materials 121 are slightly shaded, whereas the negative electrode active material 122 is darkly shaded.

In the present embodiment in which the amount of the negative electrode conductors 123 in a negative electrode mixture slurry is an appropriate amount in a manufacturing process of the negative electrode 12 (a forming process of the negative electrode active material layer 12B) described later, the negative electrode conductors 123 are dispersed substantially uniformly in the negative electrode mixture slurry. This prevents the single-walled carbon nanotubes from being easily entangled with each other as described above, resulting in a maximum outer diameter of 5 nm or less. Further, since the negative electrode conductors 123 are appropriately dispersed in the negative electrode active material layer 12B as illustrated in FIG. 4, the orientation of each of the negative electrode conductors 123 is controlled into an appropriate state.

In this case, the negative electrode conductors 123 are each in line contact with each of the negative electrode active materials 121 and 122 because the negative electrode conductors 123 are dispersed substantially uniformly. The negative electrode active materials 121 are thus easily electrically coupled to each other via the negative electrode conductors 123, and the negative electrode active materials 121 and 122 are easily electrically coupled to each other via the negative electrode conductors 123. This increases the electrical conductivity of the negative electrode 12. The physical property of the negative electrode 12 is thus properly controlled, and therefore the five-point average differential peak is detected in the five-point average differential spectrum in the range of Raman shift of 165 cm$^{-1}$ to 185 cm$^{-1}$ both inclusive.

In contrast, in a case where the negative electrode conductors 123 in an appropriate amount are not dispersed substantially uniformly in the negative electrode mixture slurry, the negative electrode conductors 123 are not appropriately dispersed in the negative electrode active material layer 12B, as illustrated in FIGS. 5 and 6. The orientation of each of the negative electrode conductors 123 is therefore not controlled into an appropriate state.

Specifically, in the first comparative example in which the amount of the negative electrode conductors 123 is insufficient, as illustrated in FIG. 5, the negative electrode conductors 123 are each in line contact with each of the negative electrode active materials 121 and 122; however, the negative electrode conductors 123 are localized only in the vicinity of the negative electrode active material 122 due to poor dispersion of the negative electrode conductors 123. As a result, although it is easy for the negative electrode active materials 121 and 122 to be electrically coupled to each other via the negative electrode conductors 123, it is difficult for the negative electrode active materials 121 to be electrically coupled to each other via the negative electrode conductors 123. This decreases the electrical conductivity of the negative electrode 12. The physical property of the negative electrode 12 is thus not properly controlled, and therefore no five-point average differential peak is detected in the five-point average differential spectrum in the range of Raman shift of 165 cm$^{-1}$ to 185 cm$^{-1}$ both inclusive.

In the second comparative example in which the amount of the negative electrode conductors 123 is excessive, as illustrated in FIG. 6, the negative electrode conductors 123 are each in line contact with each of the negative electrode active materials 121 and 122 due to substantially uniform dispersion of the negative electrode conductors 123. This allows the negative electrode active materials 121 to be easily electrically coupled to each other via the negative electrode conductors 123 and allows the negative electrode active materials 121 and 122 to be easily electrically coupled to each other via the negative electrode conductors 123.

However, in this case where the amount of the negative electrode conductors 123 is excessive, the single-walled carbon nanotubes are easily entangled with each other, resulting in a maximum outer diameter of greater than 5 nm, as described above. Moreover, a solid electrolyte interphase (SEI) film is formed on the surface of each of the negative electrode conductors 123 due to excessive dispersion of the negative electrode conductors 123, resulting in an increase in the total amount of the SEI films formed in the negative electrode active material layer 12B. This increases the reaction resistance of the negative electrode 12, which rather decreases the electrical conductivity of the negative electrode 12. The physical property of the negative electrode 12 is thus not properly controlled, and therefore no five-point average differential peak is detected in the five-point average differential spectrum in the range of Raman shift of 165 cm$^{-1}$ to 185 cm$^{-1}$ both inclusive.

Although a Raman spectroscopic apparatus used to measure the RBM spectrum is not limited to a particular type, the Raman spectroscopic apparatus is, for example, a laser Raman microscope RAMAN-11 manufactured by Nanophoton Corporation. Although measurement conditions are not limited to particular conditions, an excitation wavelength is set to 532 nm, and grating is set to 600 gr/mm. The Raman spectroscopic apparatus is able to acquire the five-point average differential spectrum on the basis of the RBM spectrum by using a calculation function for conducting a calculation process in which the differential value described above is calculated.

As described above, whether or not the five-point average differential peak is detected in the five-point average differential spectrum is determined on the basis of the forming method of the negative electrode active material layer 12B (including a procedure for preparing the negative electrode mixture slurry used to form the negative electrode active material layer 12B). The forming method of the negative electrode active material layer 12B is to be described later.

In a case of analyzing the negative electrode active material layer 12B by Raman spectroscopy to measure the RBM spectrum, the secondary battery is disassembled to thereby collect the negative electrode active material layer 12B, a measurement target, from the secondary battery.

In this case, it is preferable to use a secondary battery whose number of charging and discharging cycles (the number of charging and discharging reactions repeated) is 50 or less, as the secondary battery for measurement. A reason for this is that the orientations of the single-walled carbon nanotubes are easily maintained in the states at the time of formation of the negative electrode 12 without being influenced by the charging and discharging reactions. This allows the orientations of the single-walled carbon nanotubes to be examined in a stable and reproducible manner.

In a case where the number of charging and discharging cycles of the secondary battery is unknown, i.e., where it is difficult to identify the number of charging and discharging cycles of the secondary battery ex-post facto, it is preferable to use a new (unopened) secondary battery rather than a used (opened) secondary battery. The number of charging and discharging cycles of a new secondary battery is not much more than several cycles at most. Using a new secondary battery thus allows the orientations of the single-walled carbon nanotubes to be examined in a stable and reproducible manner.

Further, it is preferable to use the unopposed portion 12BZ illustrated in FIG. 3 as the negative electrode active material layer 12B for measurement. A reason for this is that the unopposed portion 12BZ has little involvement in the charging and discharging reactions and the orientations of the single-walled carbon nanotubes are thus easily maintained in the states at the time of formation of the negative electrode 12 without being influenced by the charging and discharging reactions. This allows the orientations of the single-walled carbon nanotubes to be examined in a stable and reproducible manner.

Upon charging the secondary battery, lithium is extracted from the positive electrode 11, and the extracted lithium is inserted into the negative electrode 12 via the electrolytic solution. Upon discharging the secondary battery, lithium is extracted from the negative electrode 12, and the extracted lithium is inserted into the positive electrode 11 via the electrolytic solution.

In a case of manufacturing the secondary battery, the positive electrode 11 and the negative electrode 12 are fabricated, following which the secondary battery is assembled according to a procedure described below.

First, the positive electrode active material is mixed with, on an as-needed basis, a material such as the positive electrode binder or the positive electrode conductor to thereby obtain a positive electrode mixture. Thereafter, the positive electrode mixture is put into a solvent such as an organic solvent to thereby prepare a positive electrode mixture slurry in a paste form. Lastly, the positive electrode mixture slurry is applied on each of opposite sides of the positive electrode current collector 11A to thereby form the positive electrode active material layer 11B. Thereafter, the positive electrode active material layer 11B may be compression-molded by a roll pressing machine. In this case, the positive electrode active material layer 11B may be heated. The positive electrode active material layer 11B may be compression-molded multiple times. The positive electrode active material layer 11B is thereby formed on each of the opposite sides of the positive electrode current collector 11A. As a result, the positive electrode 11 is fabricated.

Figure 7:
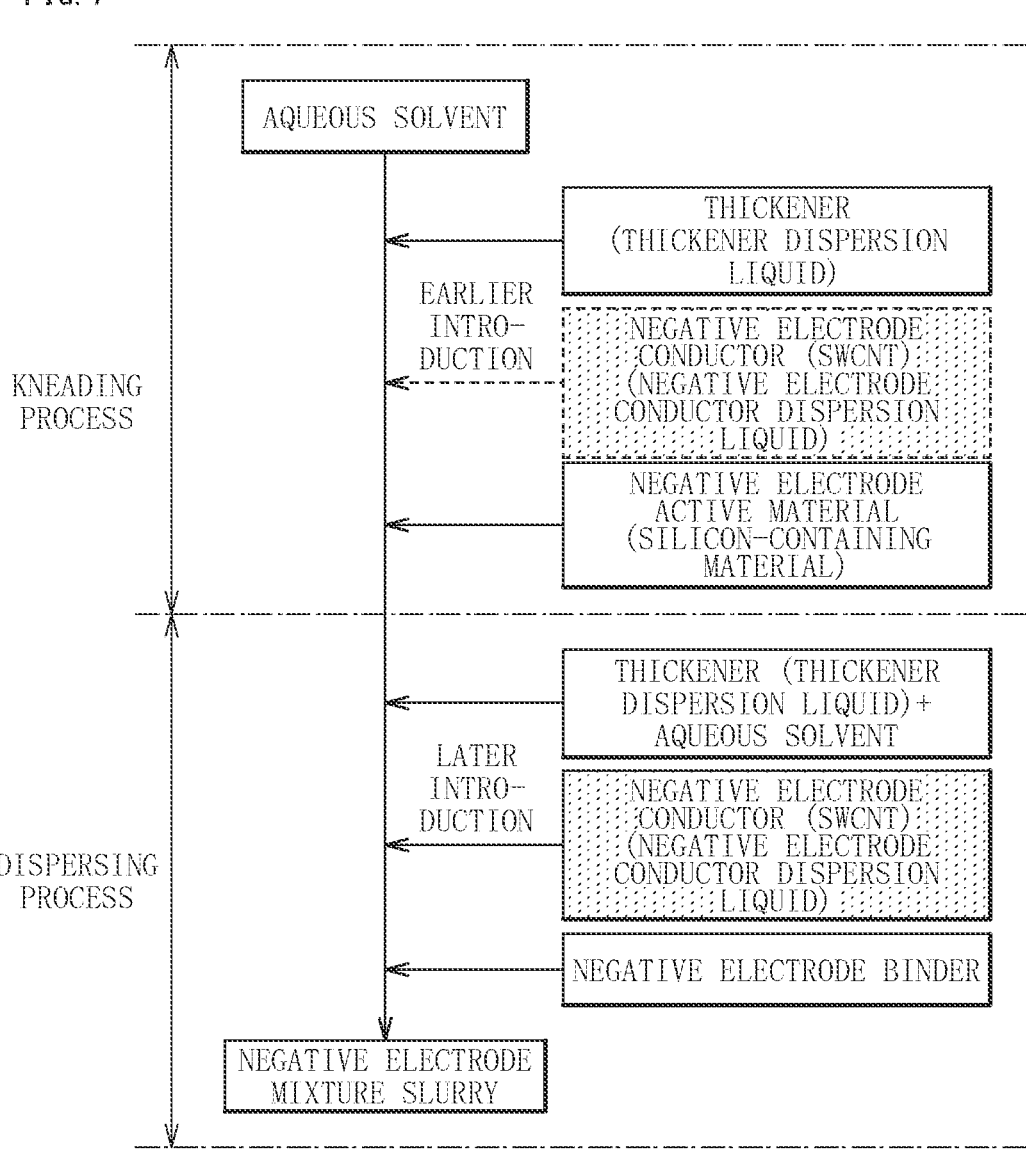
FIG. 7 is a flowchart for describing a procedure for preparing a negative electrode mixture slurry.

FIG. 7 illustrates a flow for describing a procedure for preparing the negative electrode mixture slurry, in particular, a procedure for preparing an aqueous negative electrode mixture slurry using an aqueous solvent. In a case of fabricating the negative electrode 12, the negative electrode mixture slurry is prepared according to the procedure illustrated in FIG. 7, following which the negative electrode active material layer 12B is formed using the negative electrode mixture slurry.

FIG. 7 illustrates two timings of introduction of the negative electrode conductor in the procedure for preparing the negative electrode mixture slurry. The negative electrode conductor includes the single-walled carbon nanotubes, as described above. In the following, the introduction of the negative electrode conductor that takes place in a kneading process prior to a dispersing process is referred to as "earlier introduction", and the introduction of the negative electrode conductor that takes place in the dispersing process after the kneading process is referred to as "later introduction".

In the procedure for preparing the negative electrode mixture slurry described here, the negative electrode conductor is introduced in the dispersing process, i.e., the negative electrode conductor is introduced at the later timing. In FIG. 7, the later introduction of the negative electrode conductor is indicated by a solid line, whereas the earlier introduction of the negative electrode conductor is indicated by a broken line.

Specifically, in a case of preparing the negative electrode mixture slurry, the kneading process is performed by means of a kneader, following which the dispersing process is performed by means of a stirring apparatus, as illustrated in FIG. 7.

In the kneading process, first, an aqueous solvent is prepared. The aqueous solvent is pure water, for example. Thereafter, a thickener is put into the aqueous solvent, following which the aqueous solvent is stirred by means of the kneader. In this case, the thickener is put into the aqueous solvent as a thickener dispersion liquid. The thickener dispersion liquid is an aqueous dispersion liquid in which a thickener such as carboxymethyl cellulose is dispersed in an aqueous solvent. Lastly, the negative electrode active material (the silicon-containing material) is put into the aqueous solvent while the aqueous solvent is being kneaded by means of the kneader. The negative electrode active material (the silicon-containing material) is thereby kneaded into the thickener, forming a kneaded material. The solid content concentration of the kneaded material is not limited to a particular concentration; however, it is preferable, in particular, that the solid content concentration of the kneaded material be 50 wt % to 70 wt % both inclusive.

In the dispersing process, first, a thickener (a thickener dispersion liquid) and an aqueous solvent are further put into the kneaded material while the kneaded material is being stirred by means of the stirring apparatus. Details of the thickener are as described above. As a result, a dispersion processed material is obtained.

Thereafter, the negative electrode conductor is put into the dispersion processed material while the dispersion processed material is being stirred by means of the stirring apparatus. In this case, the negative electrode conductor is put into the dispersion processed material as a negative electrode conductor dispersion liquid. The negative electrode conductor dispersion liquid is an aqueous dispersion liquid in which the single-walled carbon nanotubes are dispersed in an aqueous solvent. It is preferable that the solid content concentration (wt %) of the dispersion processed material, i.e., the content of solid substances (the negative electrode active material (the silicon-containing material) and the thickener) be not too high at the time of putting the negative electrode conductor dispersion liquid. Specifically, it is preferable that the solid content concentration of the dispersion processed material be 35 wt % to 50 wt % both inclusive. A reason for this is that, due to the dispersibility of the single-walled carbon nanotubes being secured, the single-walled carbon nanotubes are prevented from being easily entangled with each other, more specifically, from being easily aggregated with each other. In this case, an aqueous solvent may be additionally put into the dispersion processed material on an as-needed basis.

Lastly, the negative electrode binder is put into the kneaded material while the kneaded material is being stirred by means of the stirring apparatus. Details of the negative electrode binder are as described above. Specific examples of the negative electrode binder include styrene butadiene rubber. The negative electrode conductor is thereby dispersed in the kneaded material, and also the negative electrode binder is dissolved in the kneaded material. As a result, the negative electrode mixture slurry in a paste form is prepared.

For the negative electrode mixture slurry, the negative electrode conductor is introduced at the later timing using the negative electrode conductor dispersion liquid having an appropriate concentration. Thus, in the negative electrode active material layer 12B formed using the negative electrode mixture slurry, the maximum outer diameter of the single-walled carbon nanotubes is 5 nm or less, as described above. Further, the orientations of the single-walled carbon nanotubes are easily controlled into appropriate states. Thus, the five-point average differential peak is detected in the five-point average differential spectrum of the negative electrode active material layer 12B, as described above. In contrast, in a case where the negative electrode conductor is introduced at the earlier timing or in a case where the negative electrode conductor is introduced at the later timing but the concentration of the negative electrode conductor dispersion liquid is inappropriate, the maximum outer diameter of the single-walled carbon nanotubes is greater than 5 nm. Further, the orientations of the single-walled carbon nanotubes are not controlled into appropriate states. Thus, no five-point average differential peak is detected in the five-point average differential spectrum of the negative electrode active material layer 12B, as described above.

In a case of fabricating the negative electrode 12, the negative electrode mixture slurry is applied on each of the opposite sides of the negative electrode current collector 12A to thereby form the negative electrode active material layer 12B. Thereafter, the negative electrode active material layer 12B may be compression-molded in a similar manner as in the case of fabricating the positive electrode 11. The negative electrode active material layer 12B is thereby formed on each of the opposite sides of the negative electrode current collector 12A. As a result, the negative electrode 12 is fabricated.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as welding method. Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body. Thereafter, the outer package film 20 is folded in such a manner as to sandwich the wound body, following which the outer edges of two sides of the outer package film 20 (the fusion-bonding layer) are bonded with each other by a method such as a thermal fusion bonding method. Thus, the wound body is placed into the outer package film 20 having the pouch shape.

Thereafter, the electrolytic solution is injected into the outer package film 20 having the pouch shape, following which the outer edges of the remaining one side of the outer package film 20 (the fusion-bonding layer) are bonded with each other by a method such as a thermal fusion bonding method to thereby seal the outer package film 20. In this case, the sealing film 21 is disposed between the outer package film 20 and the positive electrode lead 14, and the sealing film 22 is disposed between the outer package film 20 and the negative electrode lead 15. The wound body is thereby impregnated with the electrolytic solution. Thus, the wound electrode body 10 is formed. Accordingly, the wound electrode body 10 is sealed in the outer package film 20. As a result, the secondary battery is assembled.

Lastly, the secondary battery is charged and discharged in order to stabilize an electrochemical state of the secondary battery. Various conditions including, without limitation, an environment temperature, the number of times of charging and discharging (the number of cycles), and charging and discharging conditions may be set as appropriate. The solid electrolyte interphase (SEI) film is thereby formed on the surface, for example, of the negative electrode 12, which stabilizes the electrochemical state of the secondary battery. As a result, the secondary battery of the laminated-film type is completed.

According to the secondary battery, the negative electrode 12 (the negative electrode active material layer 12B) includes the negative electrode active material (the silicon-containing material) and the negative electrode conductor (the single-walled carbon nanotubes), and the maximum outer diameter of the single-walled carbon nanotubes is 5 nm or less.

In this case, the dispersibility of the single-walled carbon nanotubes in the negative electrode active material layer 12B is secured, and the negative electrode active materials are thus easily electrically coupled to each other via the single-walled carbon nanotubes, as described above. This markedly increases the electrical conductivity between the negative electrode active materials, resulting in a marked increase in the electrical conductivity of the negative electrode active material layer 12B. Accordingly, the electrical conductivity of the negative electrode 12 markedly increases, and therefore it is possible to increase the battery capacity and improve the electric resistance characteristic, the cyclability characteristic, or both, as compared with the case where the maximum outer diameter of the single-walled carbon nanotubes is greater than 5 nm.

In particular, the five-point average differential peak may be detected in the five-point average differential spectrum of the negative electrode active material layer 12B in the range of Raman shift of 165 $cm^{-1}$ to 185 $cm^{-1}$ both inclusive. In such a case, unlike in the case where the five-point average differential peak is not detected in the five-point average differential spectrum, the orientations of the single-walled carbon nanotubes in the negative electrode active material layer 12B are controlled into appropriate states, which allows the single-walled carbon nanotubes to be easily oriented along the surface of the negative electrode active material. This allows the single-walled carbon nanotubes to easily cover the surfaces of the negative electrode active materials and allows the negative electrode active materials to be easily coupled to each other via the single-walled carbon nanotubes. Accordingly, electrons are easily transferred between the negative electrode active materials via the single-walled carbon nanotubes, which increases the electrical conductivity of the negative electrode active material layer 12B via the single-walled carbon nanotubes.

As described above, the electrical conductivity of the negative electrode active material layer 12B is increased by using the single-walled carbon nanotubes. The electrical conductivity of the negative electrode 12 thus increases. Accordingly, it is possible to achieve sufficiently high effects.

The silicon-containing material may include silicon oxide represented by SiO$_v$ (0<v<2). This reduces expansion and contraction of the negative electrode 12 at the time of charging and discharging. Accordingly, it is possible to achieve higher effects.

The negative electrode active material may further include the carbon-containing material. This allow for formation of an electrically conductive network in the negative electrode 12 while reducing expansion and contraction of the negative electrode 12 at the time of charging and discharging. Accordingly, it is possible to achieve higher effects.

Additionally, the negative electrode 12 has the configuration described above. This increases the electrical conductivity of the negative electrode 12. Accordingly, it is possible to increase the battery capacity and improve the electric resistance characteristic, the cyclability characteristic, or both of the secondary battery including the negative electrode 12.

Next, a description is given of a secondary battery of a cylindrical type including an outer package member (a battery can 41) with stiffness as an outer package member for containing a battery device inside.

Figure 8:
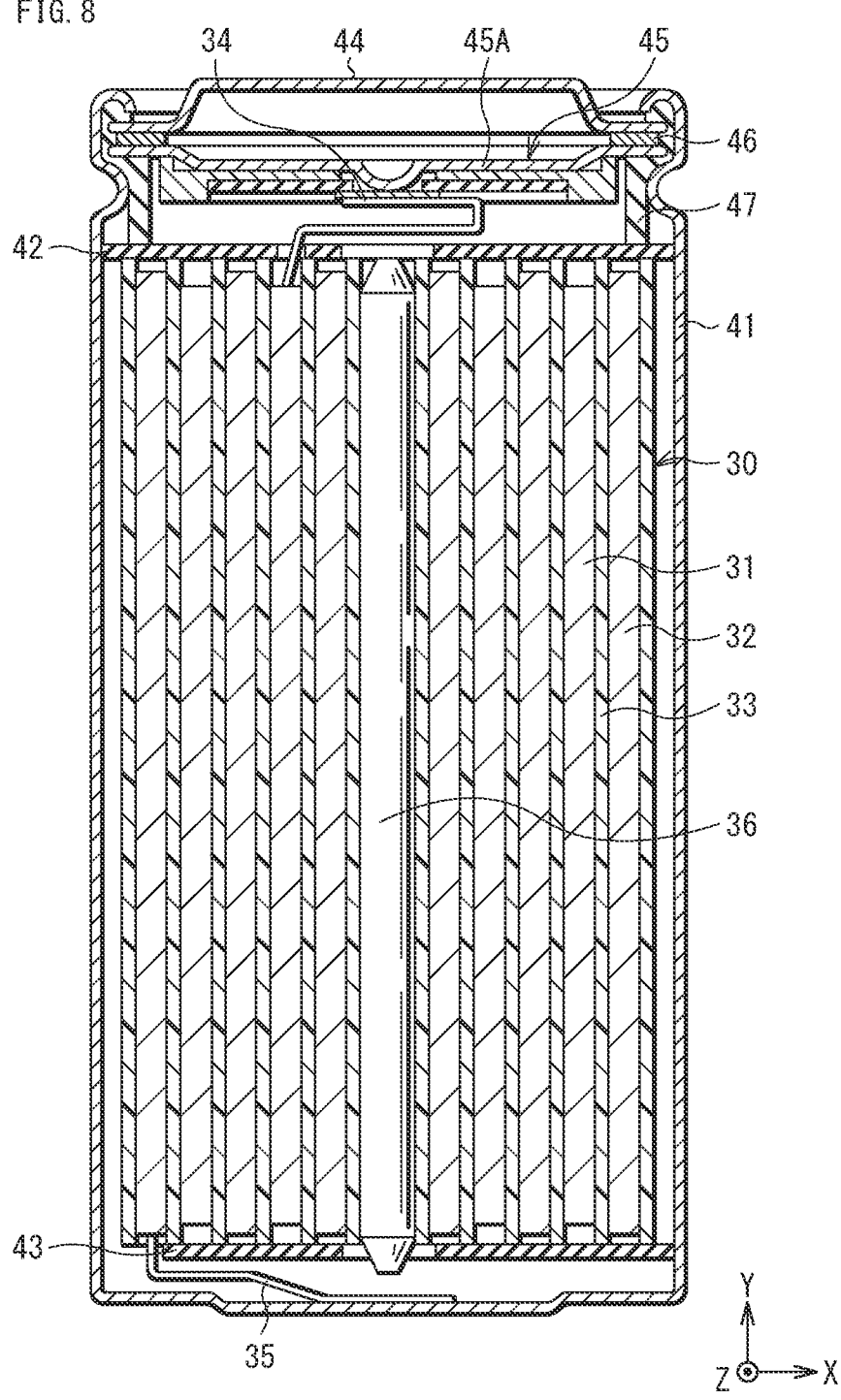
FIG. 8 is a sectional view of a configuration of another secondary battery of a cylindrical type according to an embodiment of the technology.

FIG. 8 illustrates a sectional configuration of the secondary battery of the cylindrical type. In the following description, reference will be made as necessary to FIG. 8 and the components of the secondary battery of the laminated-film type, which have been already described above.

As illustrated in FIG. 8, the secondary battery includes a pair of insulating plates 42 and 43 and a battery device of a wound type (a wound electrode body 30) that are provided inside the battery can 41 having a cylindrical shape. A positive electrode lead 34 and a negative electrode lead 35 are coupled to the wound electrode body 30.

The battery can 41 has a hollow structure with a closed end and an open end in a longitudinal direction (Y-direction), and includes one or more of metal materials including, without limitation, iron, aluminum, and an alloy thereof. The battery can 41 has a surface that may be plated with, for example, nickel. The insulating plates 42 and 43 are disposed in such a manner as to sandwich the wound electrode body 30 therebetween, and extend in a direction intersecting a wound peripheral surface of the wound electrode body 30.

A battery cover 44, a safety valve mechanism 45, and a positive temperature coefficient (PTC) device 46 are crimped at the open end of the battery can 41 by means of a gasket 47 having an insulating property, thereby sealing the open end of the battery can 41. The battery cover 44 includes a material similar to a material included in the battery can 41. The safety valve mechanism 45 and the PTC device 46 are each disposed on an inner side of the battery cover 44. The safety valve mechanism 45 is electrically coupled to the battery cover 44 via the PTC device 46. When an internal pressure of the battery can 41 reaches a certain level or higher as a result of causes including, without limitation, internal short circuiting and heating from outside, a disk plate 45A in the safety valve mechanism 45 inverts, thereby cutting off the electrical coupling between the battery cover 44 and the wound electrode body 30. The PTC device 46 involves an increase in resistance in accordance with a rise in temperature, in order to prevent abnormal heat generation resulting from a large current. The gasket 47 may have a surface on which a material such as asphalt is applied, for example.

The wound electrode body 30 includes a positive electrode 31, a negative electrode 32, a separator 33, and an electrolytic solution. The wound electrode body 30 has a structure in which the positive electrode 31 and the negative electrode 32 are stacked on each other with the separator 33 interposed therebetween, and the stack of the positive electrode 31, the negative electrode 32, and the separator 33 is wound. The positive electrode 31, the negative electrode 32, and the separator 33 are each impregnated with the electrolytic solution. The electrolytic solution has the configuration described above. The positive electrode lead 34 is coupled to the positive electrode 31 (a positive electrode current collector 31A), and the negative electrode lead 35 is coupled to the negative electrode 32 (a negative electrode current collector 32A).

A center pin 36 is disposed in the space provided at the winding center of the wound electrode body 30. Note, however, that the center pin 36 may be omitted. The positive electrode lead 34 includes one or more of electrically conductive materials including, without limitation, aluminum. The positive electrode lead 34 is electrically coupled to the battery cover 44 via the safety valve mechanism 45. The negative electrode lead 35 includes one or more of electrically conductive materials including, without limitation, copper, nickel, and stainless steel (SUS). The negative electrode lead 35 is electrically coupled to the battery can 41. The positive electrode lead 34 and the negative electrode lead 35 each have a shape such as a thin plate shape or a meshed shape.

As illustrated in FIG. 2, the positive electrode 31 includes the positive electrode current collector 31A and a positive electrode active material layer 31B, and the negative electrode 32 includes the negative electrode current collector 32A and a negative electrode active material layer 32B. The positive electrode current collector 31A, the positive electrode active material layer 31B, the negative electrode current collector 32A, and the negative electrode active material layer 32B have configurations similar to the respective configurations of the positive electrode current collector 11A, the positive electrode active material layer 11B, the negative electrode current collector 12A, and the negative electrode active material layer 12B. The separator 33 has a configuration similar to the configuration of the separator 13.

Upon charging the secondary battery, lithium ions are extracted from the positive electrode 31, and the extracted lithium ions are inserted into the negative electrode 32 via the electrolytic solution. In contrast, upon discharging the secondary battery, lithium ions are extracted from the negative electrode 32, and the extracted lithium ions are inserted into the positive electrode 31 via the electrolytic solution.

In a case of manufacturing the secondary battery, the positive electrode 31 and the negative electrode 32 are fabricated, following which the secondary battery is assembled according to a procedure described below.

The positive electrode 31 is fabricated in accordance with a procedure similar to the procedure for fabricating the positive electrode 11, and the negative electrode 32 is fabricated in accordance with a procedure similar to the procedure for fabricating the negative electrode 12. That is, in a case of fabricating the positive electrode 31, the positive electrode active material layer 31B is formed on each of opposite sides of the positive electrode current collector 31A. In a case of fabricating the negative electrode 32, the negative electrode active material layer 32B is formed on each of opposite sides of the negative electrode current collector 32A.

First, the positive electrode lead 34 is coupled to the positive electrode 31 (the positive electrode current collector 31A) by a method such as a welding method, and the negative electrode lead 35 is coupled to the negative electrode 32 (the negative electrode current collector 32A) by a method such as welding method. Thereafter, the positive electrode 31 and the negative electrode 32 are stacked on each other with the separator 33 interposed therebetween, following which the stack of the positive electrode 31, the negative electrode 32, and the separator 33 is wound to thereby fabricate a wound body. Thereafter, the center pin 36 is disposed in the space provided at the winding center of the wound body.

Thereafter, the wound body is interposed between the pair of insulating plates 42 and 43, and the wound body in that state is contained in the battery can 41 together with the insulating plates 42 and 43. In this case, the positive electrode lead 34 is coupled to the safety valve mechanism 45 by a method such as a welding method, and the negative electrode lead 35 is coupled to the battery can 41 by a method such as a welding method. Thereafter, the electrolytic solution is injected into the battery can 41 to thereby impregnate each of the positive electrode 31, the negative electrode 32, and the separator 33 with the electrolytic solution. As a result, the wound electrode body 30 is formed.

Lastly, the open end of the battery can 41 is crimped by means of the gasket 47 to thereby attach the battery cover 44, the safety valve mechanism 45, and the PTC device 46 to the open end of the battery can 41. Thus, the wound electrode body 30 is sealed in the battery can 41. As a result, the secondary battery of the cylindrical type is completed.

According to the secondary battery of the cylindrical type, the negative electrode 32 (the negative electrode active material layer 32B) has a configuration similar to that of the negative electrode 12 (the negative electrode active material layer 12B). The electrical conductivity of the negative electrode 32 thus increases for a reason similar to that in the above description of the negative electrode 12. Accordingly, it is possible to increase the battery capacity and improve the electric resistance characteristic, the cyclability characteristic, or both.

Other action and effects of the secondary battery of the cylindrical type are similar to the other action and effects of the secondary battery of the laminated-film type.

Next, a description is given of modifications of the secondary battery described above according to an embodiment. The configuration of the secondary battery may be changed as appropriate, as described below. Note that any two or more of the modifications described in sequence below may be combined to each other.

In FIGS. 1 and 2, the battery device of the wound type (the wound electrode body 10) is used. However, a battery device of a stacked type (a stacked electrode body 50) may be used, as illustrated in FIGS. 9 and 10 corresponding to FIGS. 1 and 2, respectively.

Figure 9:
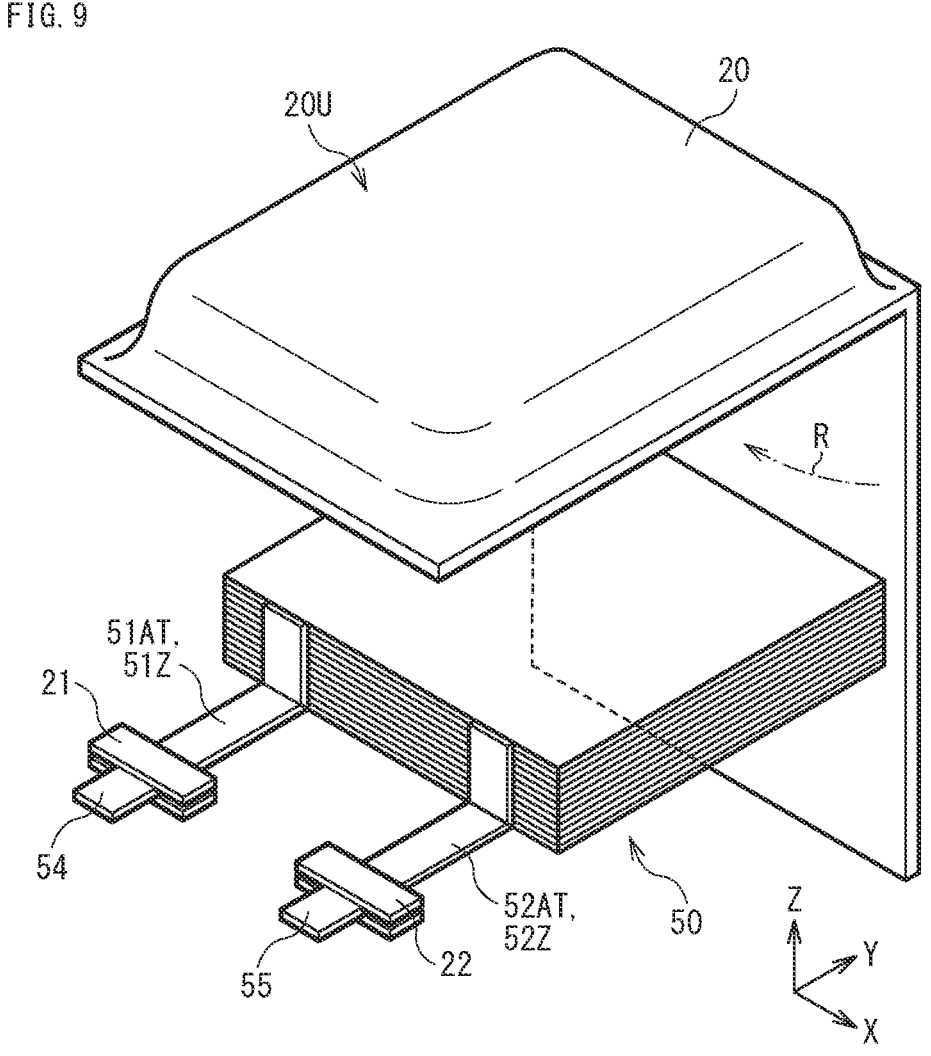
FIG. 9 is a perspective view of a configuration of a secondary battery of another laminated-film type according to a modification according to an embodiment.
Figure 10:
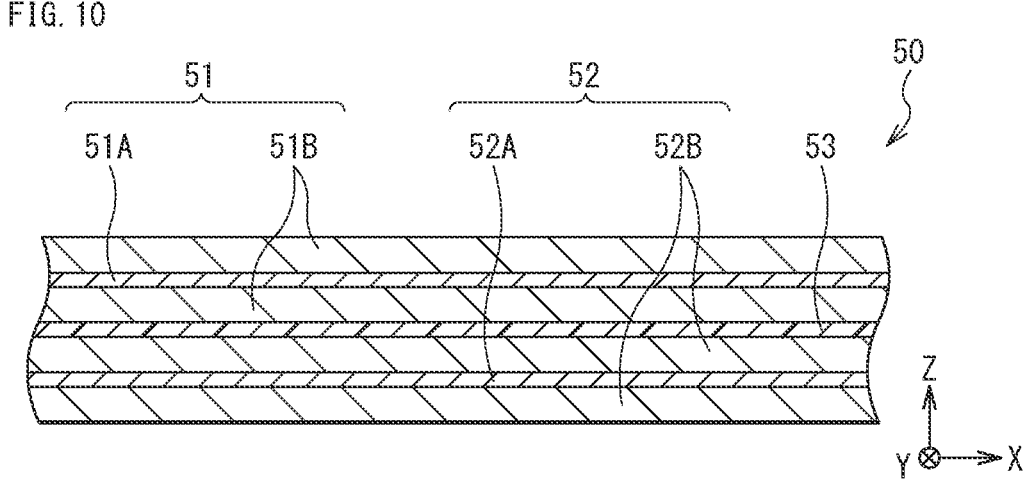
FIG. 10 is a sectional view of a configuration of a stacked electrode body illustrated in FIG. 9.

The secondary battery of the laminated-film type illustrated in FIGS. 9 and 10 has a configuration similar to that of the secondary battery of the laminated-film type illustrated in FIGS. 1 and 2 except that the stacked electrode body 50 (a positive electrode 51, a negative electrode 52, and a separator 53), a positive electrode lead 54, and a negative electrode lead 55 are included instead of the wound electrode body 10 (the positive electrode 11, the negative electrode 12, and the separator 13), the positive electrode lead 14, and the negative electrode lead 15.

The positive electrode 51, the negative electrode 52, the separator 53, the positive electrode lead 54, and the negative electrode lead 55 have configurations similar to the respective configurations of the positive electrode 11, the negative electrode 12, the separator 13, the positive electrode lead 14, and the negative electrode lead 15 except the following points.

In the stacked electrode body 50, the positive electrode 51 and the negative electrode 52 are alternately stacked on each other with the separator 53 interposed therebetween. The numbers of the positive electrodes 51, the negative electrodes 52, and the separators 53 to be stacked are not limited to a particular number. Here, the multiple positive electrodes 51 and the multiple negative electrodes 52 are alternately stacked on each other with the multiple separators 53 interposed therebetween. The positive electrodes 51, the negative electrodes 52, and the separators 53 are each impregnated with the electrolytic solution having the configuration described above. The positive electrode 51 includes a positive electrode current collector 51A and a positive electrode active material layer 51B. The negative electrode 52 includes a negative electrode current collector 52A and a negative electrode active material layer 52B.

As illustrated in FIGS. 9 and 10, the positive electrode current collector 51A includes a projecting part 51AT on which the positive electrode active material layer 51B is not formed, and the negative electrode current collector 52A includes a projecting part 52AT on which the negative electrode active material layer 52B is not formed. The projecting part 52AT is disposed at a position not overlapping the projecting part 51AT. The multiple projecting parts 51AT are joined to each other to form a single joint part 51Z having a lead shape. The multiple projecting parts 52AT are joined to each other to form a single joint part 52Z having a lead shape. The positive electrode lead 54 is coupled to the joint part 51Z, and the negative electrode lead 55 is coupled to the joint part 52Z.

A manufacturing method of the secondary battery of the laminated-film type illustrated in FIGS. 9 and 10 is similar to the manufacturing method of the secondary battery of the laminated-film type illustrated in FIGS. 1 and 2 except that the stacked electrode body 50 (the positive electrode lead 54 and the negative electrode lead 55) is fabricated instead of the wound electrode body 10 (the positive electrode lead 14 and the negative electrode lead 15).

In a case of fabricating the stacked electrode body 50, first, the positive electrode 51 including the positive electrode active material layer 51B formed on each of opposite sides of the positive electrode current collector 51A (except the projecting part 51AT) and the negative electrode 52 including the negative electrode active material layer 52B formed on each of opposite sides of the negative electrode current collector 52A (except the projecting part 52AT) are fabricated, following which the multiple positive electrodes 51 and the multiple negative electrodes 52 are alternately stacked on each other with the multiple separators 53 interposed therebetween to thereby form a stacked body.

Thereafter, the multiple projecting parts 51AT are joined to each other by a method such as a welding method to form the joint part 51Z, and the multiple projecting parts 52AT are joined to each other by a method such as a welding method to form the joint part 52Z. Thereafter, the positive electrode lead 54 is coupled to the projecting parts 51AT by a method such as a welding method, and the negative electrode lead 55 is coupled to the projecting parts 52AT by a method such as a welding method. Lastly, the electrolytic solution is injected into the outer package film 20 having the pouch shape in which the stacked body is contained, following which the outer package film 20 is sealed. Thus, the stacked body is impregnated with the electrolytic solution. As a result, the stacked electrode body 50 is fabricated.

Similar effects are obtainable also in a case where the stacked electrode body 50 is used, as in a case where the wound electrode body 10 is used. Although not specifically illustrated here, the battery device of the stacked type (the stacked electrode body 50) may be applied to the secondary battery of the cylindrical type illustrated in FIGS. 2 and 8.

The number of the positive electrode leads 54 and the number of the negative electrode leads 55 in the secondary battery of the laminated-film type illustrated in FIGS. 9 and 10 are each not limited to a particular number. That is, the number of the positive electrode leads 54 is not limited to one and may be two or greater. The number of the negative electrode lead 55 is not limited to one and may be two or greater. Similar effects are obtainable also in the case where the number of the positive electrode leads 54 and the number of the negative electrode leads 55 are changed. Although not specifically illustrated here, the number of the positive electrode leads 14 and the number of the negative electrode leads 15 may be changed in the secondary battery of the cylindrical type illustrated in FIGS. 2 and 8.

The separator 13, which is a porous film, is used in the secondary battery of the laminated-film type illustrated in FIGS. 1 and 2. However, a separator of a stacked type which includes a polymer compound layer may be used instead of the separator 13.

Specifically, the separator of the stacked type includes a base layer which is the porous film described above, and a polymer compound layer which is provided on one or both of opposite sides of the base layer. A reason for this is that adherence of the separator 13 to each of the positive electrode 11 and the negative electrode 12 is increased, which helps to prevent occurrence of a positional displacement of the wound electrode body 10. This helps to prevent swelling of the secondary battery, for example, even when a decomposition reaction of the electrolytic solution occurs. The polymer compound layer includes a polymer compound such as polyvinylidene difluoride. A reason for this is that polyvinylidene difluoride has a high physical strength and is electrochemically stable.

The base layer, the polymer compound layer, or both may include a plurality of kinds of particles including, without limitation, inorganic particles and resin particles. A reason for this is that such particles, including the inorganic particles, dissipate heat when the secondary battery generates heat, thereby increasing the thermal resistance and safety of the secondary battery. The inorganic particles are not limited to a particular kind. Examples of the inorganic particles include aluminum oxide (alumina), aluminum nitride, boehmite, silicon oxide (silica), titanium oxide (titania), magnesium oxide (magnesia), and zirconium oxide (zirconia).

In a case of fabricating the separator of the stacked type, a precursor solution including, without limitation, a polymer compound and an organic solvent is prepared, following which the precursor solution is applied on one or both of opposite sides of the base layer.

Similar effects are obtainable also in the case where the separator of the stacked type is used, as lithium ions are movable between the positive electrode 11 and the negative electrode 12. Note that the separator of the stacked type may be applied to the secondary battery of the cylindrical type illustrated in FIGS. 2 and 8.

For the secondary battery of the laminated-film type illustrated in FIGS. 1 and 2, the electrolytic solution, which is a liquid electrolyte, is used. However, an electrolyte layer which is a gel electrolyte may be used instead of the electrolytic solution.

In the wound electrode body 10 including the electrolyte layer, the positive electrode 11 and the negative electrode 12 are stacked on each other with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution that includes materials including, without limitation, an electrolytic solution, a polymer compound, and an organic solvent is prepared, following which the precursor solution is applied on each of opposite sides of the positive electrode 11 and each of opposite sides of the negative electrode 12.

Similar effects are obtainable also in the case where the electrolyte layer is used, as lithium ions are movable between the positive electrode 11 and the negative electrode 12 via the electrolyte layer. Note that the electrolyte layer may be applied to the secondary battery of the cylindrical type illustrated in FIGS. 2 and 8.

Next, a description is given of applications (application examples) of the above-described secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail. The configurations of the application examples described below are merely examples, and are appropriately modifiable. The secondary battery used in the following application examples is not limited to a particular type, and may be the laminated-film type or the cylindrical type.

Figure 11:
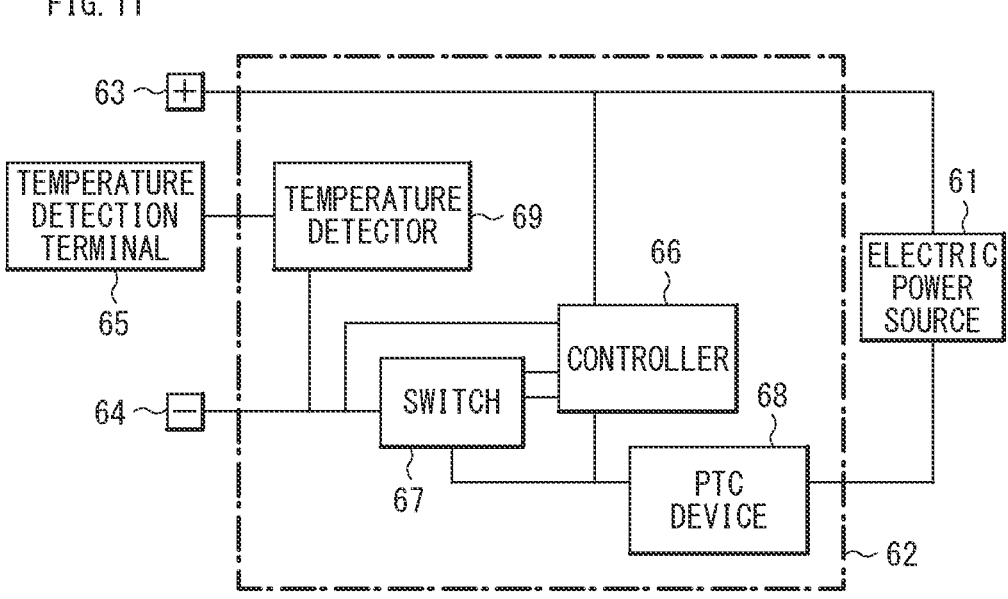
FIG. 11 is a block diagram illustrating a configuration of an application example of the secondary battery, which is a battery pack including a single battery.

FIG. 11 illustrates a block configuration of a battery pack including a single battery. The battery pack described here is a simple battery pack (a so-called soft pack) including one secondary battery, and is to be mounted on, for example, electronic equipment typified by a smartphone.

As illustrated in FIG. 11, the battery pack includes an electric power source 61 and a circuit board 62. The circuit board 62 is coupled to the electric power source 61, and includes a positive electrode terminal 63, a negative electrode terminal 64, and a temperature detection terminal (a so-called T terminal) 65.

The electric power source 61 includes one secondary battery. The secondary battery has a positive electrode lead coupled to the positive electrode terminal 63 and a negative electrode lead coupled to the negative electrode terminal 64. The electric power source 61 is couplable to outside via the positive electrode terminal 63 and the negative electrode terminal 64, and is thus chargeable and dischargeable via the positive electrode terminal 63 and the negative electrode terminal 64. The circuit board 62 includes a controller 66, a switch 67, a PTC device 68, and a temperature detector 69. However, the PTC device 68 may be omitted.

The controller 66 includes, for example, a central processing unit (CPU) and a memory, and controls an overall operation of the battery pack. The controller 66 detects and controls a use state of the electric power source 61 on an as-needed basis.

If a battery voltage of the electric power source 61 (the secondary battery) reaches an overcharge detection voltage or an overdischarge detection voltage, the controller 66 turns off the switch 67. This prevents a charging current from flowing into a current path of the electric power source 61. In addition, if a large current flows upon charging or discharging, the controller 66 turns off the switch 67 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 67 includes, for example, a charge control switch, a discharge control switch, a charging diode, and a discharging diode. The switch 67 performs switching between coupling and decoupling between the electric power source 61 and external equipment in accordance with an instruction from the controller 66. The switch 67 includes a metal-oxide-semiconductor field-effect transistor (MOSFET) including a metal-oxide semiconductor. The charging and discharging currents are detected on the basis of an ON-resistance of the switch 67.

The temperature detector 69 includes a temperature detection device such as a thermistor. The temperature detector 69 measures a temperature of the electric power source 61 using the temperature detection terminal 65, and outputs a result of the temperature measurement to the controller 66. The result of the temperature measurement to be obtained by the temperature detector 69 is used, for example, in a case where the controller 66 performs charge/discharge control upon abnormal heat generation or in a case where the controller 66 performs a correction process upon calculating a remaining capacity.

Figure 12:
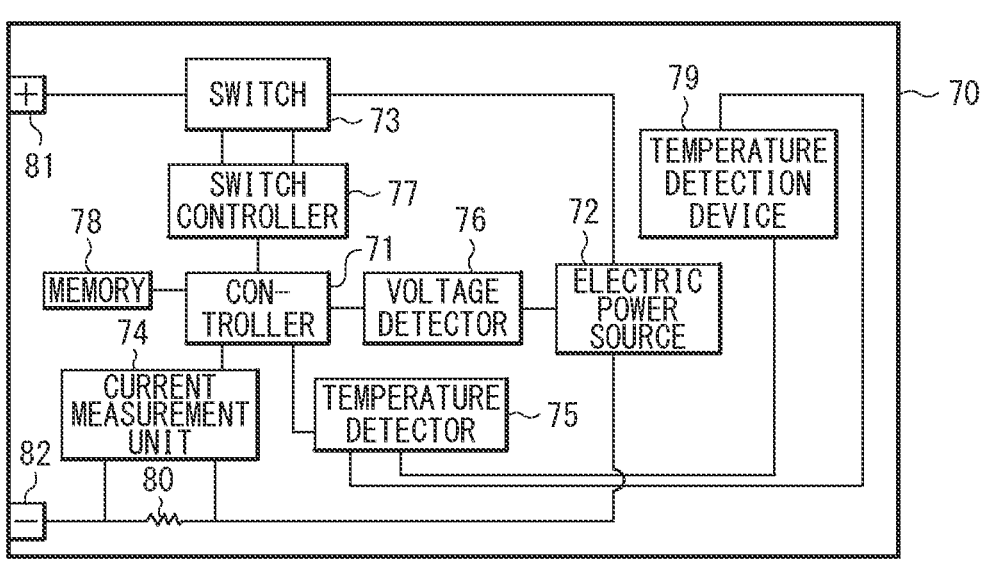
FIG. 12 is a block diagram illustrating a configuration of an application example of the secondary battery, which is a battery pack including an assembled battery.

FIG. 12 illustrates a block configuration of a battery pack including an assembled battery. In the following description, reference will be made as necessary to the components of the battery pack including the single battery (FIG. 11).

As illustrated in FIG. 12, the battery pack includes a positive electrode terminal 81 and a negative electrode terminal 82. Specifically, the battery pack includes, inside a housing 70, the following components: a controller 71, an electric power source 72, a switch 73, a current measurement unit 74, a temperature detector 75, a voltage detector 76, a switch controller 77, a memory 78, a temperature detection device 79, and a current detection resistor 80.

The electric power source 72 includes an assembled battery in which two or more secondary batteries are coupled to each other, and a type of the coupling of the two or more secondary batteries is not particularly limited. Accordingly, the coupling scheme may be in series, in parallel, or of a mixed type of both. For example, the electric power source 72 includes six secondary batteries coupled to each other in two parallel and three series.

Configurations of the controller 71, the switch 73, the temperature detector 75, and the temperature detection device 79 are similar to those of the controller 66, the switch 67, and the temperature detector 69 (the temperature detection device). The current measurement unit 74 measures a current using the current detection resistor 80, and outputs a result of the measurement of the current to the controller 71. The voltage detector 76 measures a battery voltage of the electric power source 72 (the secondary battery) and provides the controller 71 with a result of the measurement of the voltage that has been subjected to analog-to-digital conversion.

The switch controller 77 controls an operation of the switch 73 in response to signals supplied by the current measurement unit 74 and the voltage detector 76. If a battery voltage reaches an overcharge detection voltage or an over-discharge detection voltage, the switch controller 77 turns off the switch 73 (the charge control switch). This prevents a charging current from flowing into a current path of the electric power source 72. This enables the electric power source 72 to perform only discharging via the discharging diode, or only charging via the charging diode. In addition, if a large current flows upon charging or discharging, the switch controller 77 blocks the charging current or the discharging current.

The switch controller 77 may be omitted and the controller 71 may thus also serve as the switch controller 77. The overcharge detection voltage and the overdischarge detection voltage are not particularly limited, and are similar to those described above in relation to the battery pack including the single battery.

The memory 78 includes, for example, an electrically erasable programmable read-only memory (EEPROM) which is a non-volatile memory, and the memory 78 stores, for example, a numeric value calculated by the controller 71 and data (e.g., an initial internal resistance, a full charge capacity, and a remaining capacity) of the secondary battery measured in the manufacturing process.

The positive electrode terminal 81 and the negative electrode terminal 82 are terminals coupled to, for example, external equipment that operates using the battery pack, such as a laptop personal computer, or external equipment that is used to charge the battery pack, such as a charger. The electric power source 72 (the secondary battery) is chargeable and dischargeable via the positive electrode terminal 81 and the negative electrode terminal 82.

Figure 13:
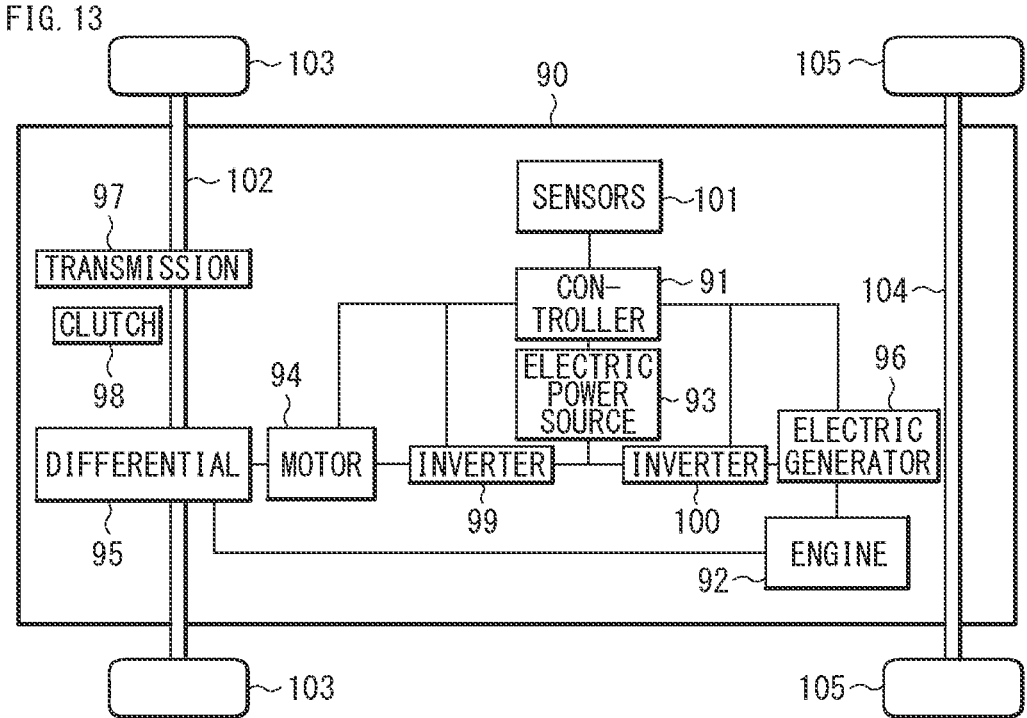
FIG. 13 is a block diagram illustrating a configuration of an application example of the secondary battery, which is an electric vehicle.

FIG. 13 illustrates a block configuration of a hybrid automobile which is an example of the electric vehicle. As illustrated in FIG. 13, the electric vehicle includes, inside a housing 90, the following components: a controller 91, an engine 92, an electric power source 93, a motor 94, a differential 95, an electric generator 96, a transmission 97, a clutch 98, inverters 99 and 100, and sensors 101. The electric vehicle also includes a front wheel drive shaft 102, a pair of front wheels 103, a rear wheel drive shaft 104, and a pair of rear wheels 105. The front wheel drive shaft 102 and the pair of front wheels 103 are coupled to the differential 95 and the transmission 97.

The electric vehicle is configured to travel by using one of the engine 92 or the motor 94 as a driving source. The engine 92 is a major power source, such as a gasoline engine. In a case where the engine 92 is used as a power source, a driving force (a rotational force) of the engine 92 is transmitted to the front wheels 103 and the rear wheels 105 via the differential 95, the transmission 97, and the clutch 98, which are driving parts. Note that the rotational force of the engine 92 is transmitted to the electric generator 96, and the electric generator 96 thus generates alternating-current power by utilizing the rotational force. In addition, the alternating-current power is converted into direct-current power via the inverter 100, and the direct-current power is thus accumulated in the electric power source 93. In contrast, in a case where the motor 94 which is a converter is used as a power source, electric power (direct-current power) supplied from the electric power source 93 is converted into alternating-current power via the inverter 99. Thus, the motor 94 is driven by utilizing the alternating-current power. A driving force (a rotational force) converted from the electric power by the motor 94 is transmitted to the front wheels 103 and the rear wheels 105 via the differential 95, the transmission 97, and the clutch 98, which are the driving parts.

When the electric vehicle is decelerated by means of a brake mechanism, a resistance force at the time of the deceleration is transmitted as a rotational force to the motor 94. Thus, the motor 94 may generate alternating-current power by utilizing the rotational force. The alternating-current power is converted into direct-current power via the inverter 99, and direct-current regenerative power is thus accumulated in the electric power source 93.

The controller 91 includes, for example, a CPU, and controls an overall operation of the electric vehicle. The electric power source 93 includes one or more secondary batteries and is coupled to an external electric power source. In this case, the electric power source 93 may be supplied with electric power from the external electric power source and thereby accumulate the electric power. The sensors 101 are used to control the number of revolutions of the engine 92 and to control an angle of a throttle valve (a throttle angle). The sensors 101 include one or more of sensors including, without limitation, a speed sensor, an acceleration sensor, and an engine speed sensor.

The case where the electric vehicle is a hybrid automobile has been described as an example; however, the electric vehicle may be a vehicle that operates using only the electric power source 93 and the motor 94 and not using the engine 92, such as an electric automobile.

Although not specifically illustrated here, other application examples are also conceivable as application examples of the secondary battery.

For example, the secondary battery is applicable to an electric power storage system. The electric power storage system includes, inside a building such as a residential house or a commercial building, the following components: a controller, an electric power source including one or more secondary batteries, a smart meter, and a power hub.

The electric power source is coupled to electric equipment such as a refrigerator installed inside the building, and is couplable to an electric vehicle such as a hybrid automobile stopped outside the building. Further, the electric power source is coupled, via the power hub, to a home power generator such as a solar power generator installed at the building, and is also coupled, via the smart meter and the power hub, to a centralized power system of an external power station such as a thermal power station.

Alternatively, the secondary battery is applicable to an electric power tool such as an electric drill or an electric saw. The electric power tool includes, inside a housing to which a movable part such as a drilling part or a saw blade part is attached, the following components: a controller, and an electric power source including one or more secondary batteries.

EXAMPLES

A description is given of Examples of the present technology according to an embodiment.

Experiment Examples 1 to 32

Secondary batteries of the laminated-film type each corresponding to the secondary battery illustrated in FIGS. 1 to 3 were fabricated, following which a battery characteristic of each of the secondary batteries was evaluated, as described below.

[Fabrication of Secondary Battery]

The secondary batteries were each fabricated according to a procedure described below.

(Fabrication of Positive Electrode)

First, 91 parts by mass of a positive electrode active material ($LiCoO_2$), 3 parts by mass of a positive electrode binder (polyvinylidene difluoride), and 6 parts by mass of a positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby obtain a positive electrode mixture slurry in a paste form. Thereafter, the positive electrode mixture slurry was applied on each of opposite sides of the covered portion 11AX of the positive electrode current collector 11A (a band-shaped aluminum foil having a thickness of 12 μm) by means of a coating apparatus, following which the applied positive electrode mixture slurry was dried to thereby form the positive electrode active material layer 11B. Lastly, the positive electrode active material layer 11B was compression-molded by means of a roll pressing machine. The positive electrode active material layer 11B was thus formed on each of opposite sides of the positive electrode current collector 11A (the covered portion 11AX). As a result, the positive electrode 11 was fabricated.

(Fabrication of Negative Electrode)

First, the kneading process was performed to obtain a kneaded material. In the kneading process, a thickener dispersion liquid (an aqueous dispersion liquid of carboxymethyl cellulose) and a negative electrode active material (a silicon-containing material) were put in this order into an aqueous solvent (pure water), while the aqueous solvent was being stirred (kneaded) by means of a kneader. Used as the silicon-containing materials were silicon oxide ($SiO_v$, where v=1, i.e., SiO), which is a compound of silicon, a simple substance of silicon (Si), and silicon carbide (SiC), which is an alloy of silicon.

Thereafter, the dispersing process was performed to prepare a negative electrode mixture slurry. In the dispersing process, a thickener dispersion liquid (an aqueous dispersion liquid of carboxymethyl cellulose), an aqueous solvent (pure water), a negative electrode conductor dispersion liquid (an aqueous dispersion liquid of the single-walled carbon nanotubes (SWCNT)), and a negative electrode binder (styrene-butadiene-based rubber) were put in this order into the kneaded material, while the kneaded material was being stirred by means of a stirring apparatus. In this case, the concentration of the negative electrode conductor dispersion liquid, i.e., the content of solid substances (the single-walled carbon nanotubes) in the negative electrode conductor dispersion liquid was so adjusted that the content (wt %) of the negative electrode conductor in the negative electrode active material layer 12B to be formed in a later process was equal to a corresponding one of the values presented in Tables 1 to 3.

In this example, the negative electrode conductor (the single-walled carbon nanotubes) was put into the kneaded material in the dispersing process, which means that the negative electrode conductor was introduced at the later timing in the procedure for preparing the negative electrode mixture slurry. The mixing ratio (weight ratio) among the negative electrode active material, the negative electrode conductor, and the negative electrode binder (the negative electrode active material: the negative electrode conductor: the negative electrode binder) was 97:1:2.

Negative electrode mixture slurries for comparison were prepared according to a similar procedure except the following points. Firstly, a carbon-containing material (graphite) was used together with a silicon-containing material as the negative electrode active material. The mixing ratio between the silicon-containing material and the carbon-containing material, i.e., the content (wt %) of each of the silicon-containing material and the carbon-containing material in the negative electrode active material was as presented in Tables 1 to 3. Secondly, only the carbon-containing material was used as the negative electrode active material without using the silicon-containing material. Thirdly, the negative electrode conductor was introduced at the earlier timing in the procedure for preparing the negative electrode mixture slurry (Experiment examples 3, 9, 15, 21, and 27). Fourthly, the multi-walled carbon nanotubes (MWCNT) were used as the negative electrode conductor. Fifthly, carbon black (CB), which is not a fibrous carbon substance, was used as the negative electrode conductor.

Thereafter, the negative electrode active material layer 12B was formed on each of opposite sides of the negative electrode current collector 12A by a coating method. In this case, the negative electrode mixture slurry was applied on each of the opposite sides of the negative electrode current collector 12A (a band-shaped copper foil having a thickness of 15 μm) by means of a coating apparatus, following which the applied negative electrode mixture slurry was dried to thereby form the negative electrode active material layer 12B. Thereafter, the negative electrode active material layer 12B was compression-molded by means of a roll pressing machine. The negative electrode active material layer 12B was thus formed on each of the opposite sides of the negative electrode current collector 12A. As a result, the negative electrode 12 was fabricated.

(Preparation of Electrolytic Solution)

An electrolyte salt (lithium hexafluoride phosphate) was added to a solvent (ethylene carbonate and diethyl carbonate), following which the solvent was stirred. In this case, the mixing ratio (mass ratio) of the solvent between ethylene carbonate and diethyl carbonate was 30:70. The content of the electrolyte salt was 1 mol/kg with respect to the solvent.

(Assembly of Secondary Battery)

First, the positive electrode lead 14 including aluminum was welded to the positive electrode current collector 11A, and the negative electrode lead 15 including copper was welded to the negative electrode current collector 12A. Thereafter, the positive electrode 11 and the negative electrode 12 were stacked on each other with the separator 13 (a fine-porous polyethylene film having a thickness of 15 μm) interposed therebetween to thereby form a stacked body. Thereafter, the stacked body was wound, following which a protective tape was attached to the surface of the stacked body to thereby form a wound body.

Thereafter, the outer package film 20 was folded in such a manner as to sandwich the wound body, following which the outer edges of two sides of the outer package film 20 were thermal-fusion-bonded to each other. As the outer package film 20, an aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from the inner side. In this case, the sealing film 21 (a polypropylene film having a thickness of 5 μm) was interposed between the outer package film 20 and the positive electrode lead 14, and the sealing film 22 (a polypropylene film having a thickness of 5 μm) was interposed between the outer package film 20 and the negative electrode lead 15.

Thereafter, the electrolytic solution was injected into the outer package film 20, following which the outer edges of the remaining one side of the outer package film 20 were thermal-fusion-bonded to each other in a reduced-pressure environment. Thus, the wound body was impregnated with the electrolytic solution to thereby form the wound electrode body 10, and the wound electrode body 10 was sealed in the outer package film 20. As a result, the secondary battery was assembled.

Lastly, the secondary battery was charged and discharged for one cycle in an ambient temperature environment (temperature=23° C.) in order to stabilize the electrochemical state of the secondary battery. Conditions of charging and discharging were similar to those in a case of examining the battery capacity characteristic described below. The SEI film was thereby formed on the surface, for example, of the negative electrode 12. As a result, the secondary battery of the laminated-film type was completed.

[Evaluation of Battery Characteristic]

The configuration (the maximum outer diameter of the single-walled carbon nanotubes) and the physical property (the presence or absence of the five-point average differential peak detected) of the negative electrode 12 (the negative electrode active material layer 12B) were examined, and the secondary batteries were evaluated for battery characteristics, i.e., the battery capacity characteristic, the electric resistance characteristic, and the cyclability characteristic. The results are presented Tables 1 to 3.

(Configuration of Negative Electrode)

In a case of examining the configuration of the negative electrode 12, the secondary battery was disassembled to thereby collect the negative electrode 12. Thereafter, the maximum outer diameter (nm) of the single-walled carbon nanotubes was determined on the basis of the result of observation (a micrograph) of the negative electrode active material layer 12B obtained by means of a scanning electron microscope (SEM) according to the procedure described above.

(Physical Property of Negative Electrode)

In a case of examining the physical property of the negative electrode 12, the negative electrode 12 was collected from the secondary battery, following which the negative electrode current collector 12A was removed by peeling from the negative electrode active material layer 12B to thereby collect the negative electrode active material layer 12B. Thereafter, the Raman spectrum of the negative electrode active material layer 12B was acquired at an interval of Raman shift of 2.2 cm$^{-1}$ (grating=600 gr/mm) according to the procedure described above. Thereafter, the five-point average differential spectrum of each Raman spectrum was calculated to thereby determine whether or not the five-point average differential peak was detected in the range of Raman shift of 165 cm$^{-1}$ to 185 cm$^{-1}$ both inclusive. In this case, the unopposed portion 12BZ of the negative electrode active material layer 12B was analyzed by Raman spectroscopy.

Figure 14:
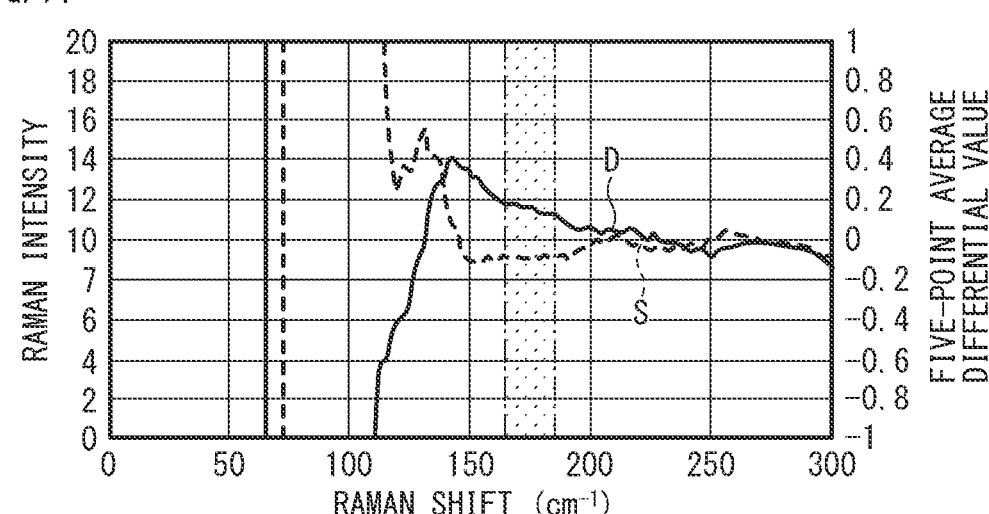
FIG. 14 illustrates a RBM spectrum and a five-point average differential spectrum of a negative electrode active material layer in Experiment example 3 in which the negative electrode conductor was single-walled carbon nanotubes, the negative electrode conductor was introduced at earlier introduction, and no five-point average differential peak was detected.
Figure 15:
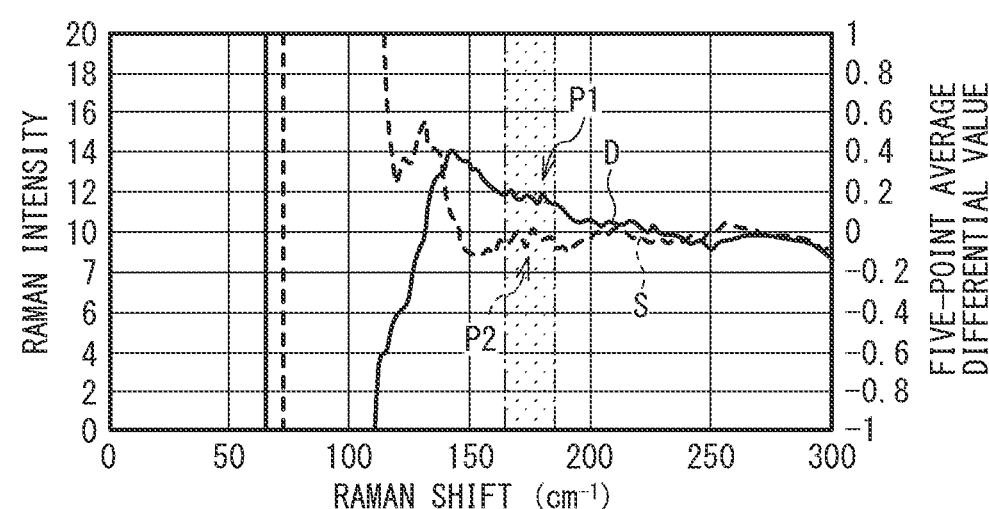
FIG. 15 illustrates a RBM spectrum and a five-point average differential spectrum of a negative electrode active material layer in Experiment example 2 in which the negative electrode conductor was single-walled carbon nanotubes, the negative electrode conductor was introduced at later introduction, and a five-point average differential peak was detected.

FIGS. 14 and 15 each illustrate a RBM spectrum S and a five-point average differential spectrum D of the negative electrode active material layer 12B. FIG. 14 illustrates the results of Experiment example 3 in which the negative electrode conductor was SWCNT, the negative electrode conductor was introduced at the earlier timing, and no five-point average differential peak was detected. FIG. 15 illustrates the results of Experiment example 2 in which the negative electrode conductor was SWCNT, the negative electrode conductor was introduced at the later timing, and the five-point average differential peak was detected.

Figure 16:
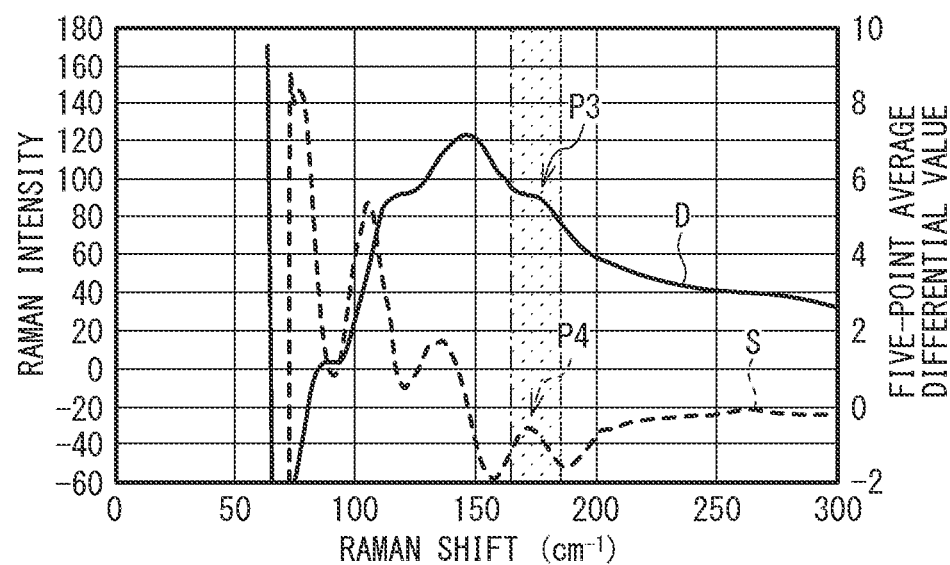
FIG. 16 illustrates a RBM spectrum and a five-point average differential spectrum of a single-walled carbon nanotube in which a five-point average differential peak was detected.
Figure 17:
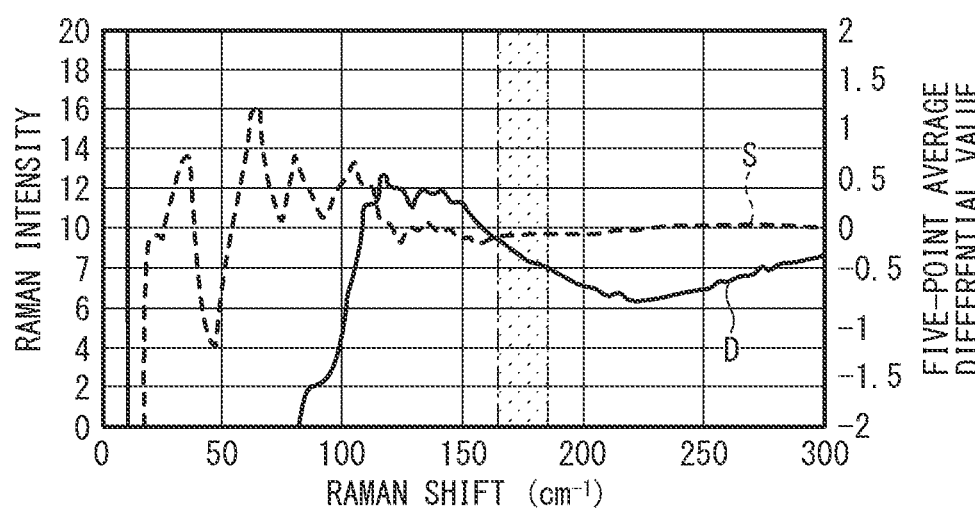
FIG. 17 illustrates a RBM spectrum and a five-point average differential spectrum of a negative electrode active material layer in a reference example in which no negative electrode conductor was introduced and no five-point average differential peak was detected.

Just for reference, FIG. 16 illustrates a RBM spectrum S and a five-point average differential spectrum D of a single-walled carbon nanotube in which the five-point average differential peak was detected. FIG. 17 illustrates a RBM spectrum S and a five-point average differential spectrum D of a negative electrode active material layer 12B of a reference example in which no negative electrode conductor was introduced and no five-point average differential peak was detected. The negative electrode active material layer 12B of this reference example was formed according to a procedure similar to the procedure for forming the negative electrode active material layer 12B in each of Experiment examples 2 and 3 except that no negative electrode conductor was used.

Note that, in each of FIGS. 14 to 17, the RBM spectrum S is indicated by a broken line, the five-point average differential spectrum D is indicated by a solid line, and the range of Raman shift of 165 cm$^{-1}$ to 185 cm$^{-1}$ is slightly shaded.

(Battery Capacity Characteristic)

In a case of examining the battery capacity characteristic, the secondary battery was charged and discharged in an ambient temperature environment (temperature=23° C.) to thereby measure a discharge capacity (mAh). Thereafter, a battery capacity (mAh/g) was calculated on the basis of the weight (g) of the negative electrode active material: battery capacity (mAh/g)=discharge capacity (mAh)/weight (g) of negative electrode active material.

Upon charging, the secondary battery was charged with a constant current of 0.1 C until a voltage reached 4.2 V, following which the secondary battery was charged with a constant voltage of 4.2 V until a current reached 0.05 C. Upon discharging, the secondary battery was discharged with a constant current of 0.1 C until a voltage reached 2.5 V. Note that 0.1 C is a value of a current that causes a battery capacity (theoretical capacity) to be completely discharged in 10 hours, and 0.05 C is a value of a current that causes the battery capacity to be completely discharged in 20 hours.

(Electric Resistance Characteristic)

In a case of examining the electric resistance characteristic, the secondary battery was charged and discharged for 10 cycles in an ambient temperature environment (temperature=23° C.), following which the electric resistance (direct-current resistance: Ω) of the secondary battery was measured by means of a battery tester. Note that conditions of charging and discharging were similar to those in the case of examining the battery capacity characteristic.

(Cyclability Characteristic)

In a case of evaluating the cyclability characteristic, first, the secondary battery was charged and discharged for one cycle in an ambient temperature environment (temperature=23° C.) to thereby measure a discharge capacity (a first-cycle discharge capacity). Thereafter, the secondary battery was charged and discharged in the same environment until the number of charging and discharging cycles reached 10 cycles to thereby measure a discharge capacity (a 10th-cycle discharge capacity). Lastly, the following was calculated: retention rate (%)=(10th-cycle discharge capacity/first-cycle discharge capacity)×100. Note that conditions of charging and discharging were similar to those in the case of examining the battery capacity characteristic.

TABLE 1

| Experiment example | Negative electrode active material | | | | Negative electrode conductor | | | | Battery capacity (mAh/g) | Electric resistance (Ω) | Capacity retention rate (%) |
|---|---|---|---|---|---|---|---|---|---|---|---|
| | Silicon-containing material | | Carbon-containing material | | | Maximum outer | | Five-point average | | | |
| | Kind | Content (wt %) | Kind | Content (wt %) | Kind | diameter (nm) | Content (wt %) | differential peak | | | |
| 1 | SiO | 100 | — | — | SWCNT | 2 | 0.01 | Detected | 1800 | 9.8 | 82 |
| 2 | | | | | SWCNT | 5 | 0.03 | Detected | 1800 | 10.1 | 85 |
| 3 | | | | | SWCNT | 5 | 0.03 | Not detected | 1800 | 10.2 | 77 |
| 4 | | | | | SWCNT | 7 | 0.1 | Detected | 1800 | 11.3 | 85 |
| 5 | | | | | MWCNT | 5 | 0.03 | Not detected | 1800 | 11.8 | 43 |
| 6 | | | | | CB | — | 0.03 | Not detected | 1800 | 9.5 | 21 |
| 7 | SiO | 25 | Graphite | 75 | SWCNT | 2 | 0.01 | Detected | 702 | 10.8 | 92 |
| 8 | | | | | SWCNT | 5 | 0.03 | Detected | 702 | 11.1 | 94 |
| 9 | | | | | SWCNT | 5 | 0.03 | Not detected | 702 | 11.3 | 87 |
| 10 | | | | | SWCNT | 7 | 0.1 | Detected | 702 | 12.2 | 91 |
| 11 | | | | | MWCNT | 5 | 0.03 | Not detected | 702 | 12.8 | 67 |
| 12 | | | | | CB | — | 0.03 | Not detected | 702 | 10.3 | 59 |

TABLE 2

| Experiment example | Negative electrode active material | | | | Negative electrode conductor | | | | Battery capacity (mAh/g) | Electric resistance (Ω) | Capacity retention rate (%) |
|---|---|---|---|---|---|---|---|---|---|---|---|
| | Silicon-containing material | | Carbon-containing material | | | Maximum outer | | Five-point average | | | |
| | Kind | Content (wt %) | Kind | Content (wt %) | Kind | diameter (nm) | Content (wt %) | differential peak | | | |
| 13 | SiO | 14 | Graphite | 86 | SWCNT | 2 | 0.01 | Detected | 556 | 11.1 | 98 |
| 14 | | | | | SWCNT | 5 | 0.03 | Detected | 556 | 11.7 | 100 |
| 15 | | | | | SWCNT | 5 | 0.03 | Not detected | 556 | 11.9 | 82 |
| 16 | | | | | SWCNT | 7 | 0.1 | Detected | 556 | 12.6 | 88 |
| 17 | | | | | MWCNT | 5 | 0.03 | Not detected | 556 | 13.2 | 71 |
| 18 | | | | | CB | — | 0.03 | Not detected | 556 | 11.0 | 62 |
| 19 | SiO | 6.5 | Graphite | 93.5 | SWCNT | 2 | 0.01 | Detected | 456 | 11.4 | 96 |
| 20 | | | | | SWCNT | 5 | 0.03 | Detected | 456 | 11.8 | 98 |
| 21 | | | | | SWCNT | 5 | 0.03 | Not detected | 456 | 11.9 | 93 |
| 22 | | | | | SWCNT | 7 | 0.1 | Detected | 456 | 12.8 | 95 |
| 23 | | | | | MWCNT | 5 | 0.03 | Not detected | 456 | 13.5 | 93 |
| 24 | | | | | CB | — | 0.03 | Not detected | 456 | 12.0 | 78 |

50

TABLE 3

| Experiment example | Negative electrode active material | | | | Negative electrode conductor | | | | Battery capacity (mAh/g) | Electric resistance (Ω) | Capacity retention rate (%) |
|---|---|---|---|---|---|---|---|---|---|---|---|
| | Silicon-containing material | | Carbon-containing material | | | Maximum outer | | Five-point average | | | |
| | Kind | Content (wt %) | Kind | Content (wt %) | Kind | diameter (nm) | Content (wt %) | differential peak | | | |
| 25 | — | — | Graphite | 100 | SWCNT | 2 | 0.01 | Detected | 360 | 15.1 | 99 |
| 26 | | | | | SWCNT | 5 | 0.03 | Detected | 360 | 15.2 | 99 |

TABLE 3-continued

| | Negative electrode active material | | | | Negative electrode conductor | | | | | | |
| | Silicon-containing material | | Carbon-containing material | | | Maximum outer | | Five-point average | Battery | Electric | Capacity retention |
| Experiment example | Kind | Content (wt %) | Kind | Content (wt %) | Kind | diameter (nm) | Content (wt %) | differential peak | capacity (mAh/g) | resistance (Ω) | rate (%) |
|---|---|---|---|---|---|---|---|---|---|---|---|
| 27 | | | | | SWCNT | 5 | 0.03 | Not detected | 360 | 15.1 | 99 |
| 28 | | | | | SWCNT | 7 | 0.1 | Detected | 360 | 16.2 | 99 |
| 29 | | | | | MWCNT | 5 | 0.03 | Not detected | 360 | 17.0 | 99 |
| 30 | | | | | CB | — | 0.03 | Not detected | 360 | 15.3 | 99 |
| 31 | Si | 14 | Graphite | 86 | SWCNT | 2 | 0.01 | Detected | 565 | 11.4 | 100 |
| 32 | SiC | 14 | Graphite | 86 | SWCNT | 2 | 0.01 | Detected | 380 | 11.1 | 100 |

As indicated in FIGS. 14 to 17 and Tables 1 to 3, the presence or absence of the five-point average differential peak detected changed depending on the forming method of the negative electrode 12, and the battery characteristic of the secondary battery changed depending on the configuration and the physical property of the negative electrode 12 (the negative electrode active material layer 12B).

(Presence or Absence of Five-Point Average Differential Peak Detected)

In a case of analyzing the single-walled carbon nanotube, a RBM peak P4 was detected in the RBM spectrum S in the range of Raman shift of 165 cm$^{-1}$ to 185 cm$^{-1}$ both inclusive, as illustrated in FIG. 16. Accordingly, a five-point average differential peak P3 corresponding to the RBM peak P4 was detected in the five-point average differential spectrum D in the range of Raman shift of 165 cm$^{-1}$ to 185 cm$^{-1}$ both inclusive.

In a case of analyzing the negative electrode active material layer 12B of the reference example without including the negative electrode conductor (the single-walled carbon nanotubes), no RBM peak was detected in the RBM spectrum S in the range of Raman shift of 165 cm$^{-1}$ to 185 cm$^{-1}$ both inclusive, as illustrated in FIG. 17. Accordingly, no five-point average differential peak was detected in the five-point average differential spectrum D in the range of Raman shift of 165 cm$^{-1}$ to 185 cm$^{-1}$ both inclusive.

In contrast, in a case of analyzing the negative electrode active material layer 12B in which the silicon-containing material was included as the negative electrode active material and the single-walled carbon nanotubes were included as the negative electrode conductor, the presence or absence of the five-point average differential peak detected changed depending on the forming method of the negative electrode active material layer 12B.

Specifically, in Experiment example 3 in which the negative electrode conductor (the single-walled carbon nanotubes) was introduced at the earlier timing in the preparation of the negative electrode mixture slurry, as illustrated in FIG. 14, no RBM peak was detected in the RBM spectrum S in the range of Raman shift of 165 cm$^{-1}$ to 185 cm$^{-1}$ both inclusive. Accordingly, no five-point average differential peak was detected in the five-point average differential spectrum D in the range of Raman shift of 165 cm$^{-1}$ to 185 cm$^{-1}$ both inclusive.

However, in Experiment example 2 in which the negative electrode conductor (the single-walled carbon nanotubes) was introduced at the later timing in the preparation of the negative electrode mixture slurry, as illustrated in FIG. 15, a RBM peak P2 was detected in the RBM spectrum S in the range of Raman shift of 165 cm$^{-1}$ to 185 cm$^{-1}$ both inclusive. Accordingly, a five-point average differential peak P1 corresponding to the RBM peak P2 was detected also in the five-point average differential spectrum D in the range of Raman shift of 165 cm$^{-1}$ to 185 cm$^{-1}$ both inclusive.

(Relationship of Configuration and Physical Property of Negative Electrode with Battery Characteristic)

As indicated in Tables 1 to 3, in a case where the negative electrode active material layer 12B included the negative electrode active material (the silicon-containing material) and the negative electrode conductor (the single-walled carbon nanotubes), the battery capacity characteristic, the electric resistance characteristic, and the cyclability characteristic each changed depending on the configuration of the negative electrode 12 (the negative electrode active material layer 12B), i.e., the maximum outer diameter of the single-walled carbon nanotubes.

Specifically, in a case where the negative electrode active material included only the carbon-containing material (graphite) (Experiment examples 25 to 30), a high capacity retention rate was obtained regardless of the maximum outer diameter, whereas the battery capacity largely decreased and the electric resistance largely increased.

In contrast, in a case where the negative electrode active material included the silicon-containing material (SiO) (Experiment examples 1 to 24), the battery capacity, the electric resistance, and the capacity retention rate each largely changed depending on the maximum outer diameter.

That is, in a case where the maximum outer diameter was 5 nm or less (Experiment examples 1 to 3), the electric resistance decreased while the battery capacity remained substantially the same and a high capacity retention rate was secured, as compared with a case where the maximum outer diameter was greater than 5 nm (Experiment example 4).

These tendencies described here were similarly obtained also in a case where the negative electrode active material included the carbon-containing material together with the silicon-containing material (e.g., Experiment examples 7 to 10), and also in a case where another material (Si or SiC) was used as the silicon-containing material (Experiment examples 31 and 32). In particular, in the case where the negative electrode active material included the carbon-containing material together with the silicon-containing material, the capacity retention rate further increased although the electric resistance slightly increased.

Additionally, in the case where the maximum outer diameter was 5 nm or less, the following tendencies were obtained. In a case where the content of the negative electrode conductor in the negative electrode active material layer 12B was 0.01 wt % to 0.03 wt % both inclusive (Experiment examples 1 to 3), an increase in the maximum outer diameter was suppressed, and thus the maximum outer diameter was 5 nm or less. Additionally, in a case where the five-point average differential peak was detected (Experiment examples 1 and 2), the electric resistance further decreased, and the capacity retention rate further increased.

In a case where another material (multi-walled carbon nanotubes or carbon black) was used as the negative electrode conductor (Experiment examples 5 and 6), the capacity retention rate markedly decreased.

These tendencies described here were similarly obtained also in the case where the negative electrode active material included the carbon-containing material together with the silicon-containing material (e.g., Experiment examples 11 and 12).

As in the results indicated in FIGS. 14 to 17 and Tables 1 to 3, in the case where the negative electrode active material layer 12B of the negative electrode 12 included the negative electrode active material (the silicon-containing material) and the negative electrode conductor (the single-walled carbon nanotubes) and where the maximum outer diameter of the single-walled carbon nanotubes was 5 nm or less, the battery capacity increased, and the electric resistance characteristic, the cyclability characteristic, or both improved. Accordingly, a superior battery characteristic of the secondary battery was obtained.

Although the technology has been described above with reference to the embodiments and Examples, configurations of the technology are not limited to those described with reference to the embodiments and Examples above, and are therefore modifiable in a variety of ways.

For example, although the descriptions have been given of the case where the liquid electrolyte (electrolytic solution) is used and the case where the gel electrolyte (electrolyte layer) is used, the electrolyte is not limited to a particular kind. Alternatively, an electrolyte in a solid form (solid electrolyte) may be used.

Moreover, although the description has been given of the case where the secondary battery has a battery structure of the laminated-film type or the cylindrical type, the battery structure is not limited to a particular structure. Alternatively, the secondary battery may have a battery structure of any other type, such as a prismatic type, a coin type, or a button type.

Moreover, although the description has been given of the case where the battery device has a device structure of the wound type or the stacked type, the device structure of the battery device is not limited to a particular structure. Alternatively, the battery device may have a device structure of any other type, such as a zigzag folded type in which the electrodes (the positive electrode and the negative electrode) are folded in a zigzag manner.

Further, although the description has been given of the case where the electrode reactant is lithium, the electrode reactant is not limited to a particular element. Specifically, the electrode reactant may be another alkali metal such as sodium or potassium, or may be an alkaline earth metal such as beryllium, magnesium, or calcium, as described above. Alternatively, the electrode reactant may be another light metal such as aluminum.

Note that the effects described herein are mere examples, and effects of the technology are therefore not limited to those described herein. Accordingly, the technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   a positive electrode;
   a negative electrode including a negative electrode active material layer,
   wherein the negative electrode active material layer includes a negative electrode current collector material, a first negative electrode active material, and a second negative electrode active material, wherein the first negative electrode active material includes a silicon-containing material, wherein the second negative electrode active material includes a carbon-containing material, and wherein the negative electrode current collector material is a plurality of single-walled carbon nanotubes, the plurality of single-walled carbon nanotubes are entangled to define an entangled single-walled carbon nanotubes structure, wherein the entangled single-walled carbon nanotubes structure having a maximum outer diameter of 5 nanometers or less,
   a peak is detected in a range of Raman shift of 165 $cm^{-1}$ or greater and 185 $cm^{-1}$ or less in five-point average differentiation of a Raman spectrum of the negative electrode active material layer in a radial breathing mode, the Raman spectrum being measured by Raman spectroscopy; and
   an electrolytic solution.

2. The secondary battery according to claim 1, wherein the silicon-containing material includes a silicon oxide represented by $SiO_v$, where v is greater than 0 and less than 2.

3. The secondary battery according claim 1, wherein the negative electrode active material layer includes a content of the single-walled carbon nanotubes from about 0.01 wt % to about 0.03 wt %.

4. The secondary battery according to claim 3, wherein the silicon-containing material is Si, SiC or a silicon oxide represented by $SiO_v$, where v is greater than 0 and less than 2, and wherein the carbon-containing material is graphite.

5. The secondary battery according to claim 4, wherein an amount of the silicon-containing material is from 6.5 wt % to 25 wt %, wherein an amount of the carbon-containing material is from 75 wt % to 93.5 wt %.

6. The secondary battery according to claim 5, wherein the silicon-containing material is SiO.

7. A negative electrode for a secondary battery, the negative electrode comprising:
   a negative electrode active material layer, wherein the negative electrode active material layer includes a negative electrode current collector material, a first negative electrode active material, and a second negative electrode active material,
   wherein the first negative electrode active material includes a silicon-containing material,
   wherein the second negative electrode active material includes a carbon-containing material, and
   wherein the negative electrode current collector material is a plurality of single-walled carbon nanotubes, the plurality of single-walled carbon nanotubes are entangled to define an entangled single-walled carbon nanotubes structure, wherein the entangled single-walled carbon nanotubes structure having a maximum outer diameter of 5 nanometers or less, and a peak is detected in a range of Raman shift of 165 cm$^{-1}$ or greater and 185 cm$^{-1}$ or less in five-point average differentiation of a Raman spectrum of the negative electrode active material layer in a radial breathing mode, the Raman spectrum being measured by Raman spectroscopy.

8. The negative electrode according to claim 7, wherein the silicon-containing material includes a silicon oxide represented by SiO$_v$ where v is greater than 0 and less than 2.

9. A secondary battery comprising:

a positive electrode;

a negative electrode including a negative electrode active material layer, wherein the negative electrode active material layer includes a negative electrode current collector material, a first negative electrode active material, and a second negative electrode active material, wherein the first negative electrode active material includes a silicon-containing material to provide a dispersed negative electrode material to which a thickening agent is added thereby providing a solid content of the dispersed negative electrode material of 35 wt % to 50 wt %, wherein the second negative electrode active material includes a carbon-containing material, wherein the negative electrode current collector material is a plurality of single-walled carbon nanotubes that are dispersed in the dispersed negative electrode material, wherein the plurality of single-walled carbon nanotubes are entangled to define an single-walled entangled carbon nanotubes structure, and wherein the entangled single-walled carbon nanotubes structure having a maximum outer diameter of 5 nanometers or less, a peak is detected in a range of Raman shift of 165 cm$^{-1}$ or greater and 185 cm$^{-1}$ or less in five-point average differentiation of a Raman spectrum of the negative electrode active material layer in a radial breathing mode, the Raman spectrum being measured by Raman spectroscopy; and an electrolytic solution.

\* \* \* \* \*